(12) United States Patent
Hyde et al.

(10) Patent No.: US 9,491,637 B2
(45) Date of Patent: Nov. 8, 2016

(54) PORTABLE WIRELESS NODE AUXILIARY RELAY

(71) Applicant: Elwha LLC, Bellevue, WA (US)

(72) Inventors: Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 179 days.

(21) Appl. No.: 13/956,107

(22) Filed: Jul. 31, 2013

(65) Prior Publication Data

US 2014/0349569 A1  Nov. 27, 2014

Related U.S. Application Data

(63) Continuation-in-part of application No. 13/945,801, filed on Jul. 18, 2013, which is a continuation-in-part of application No. 13/936,921, filed on Jul. 8, 2013, which is a continuation-in-part of application No. 13/904,970, filed on May 29, 2013, which is a continuation-in-part of application No. 13/902,585, filed on May 24, 2013, which is a continuation-in-part of application No. 13/842,040, filed on Mar. 15, 2013.

(51) Int. Cl.
*H04B 7/15* (2006.01)
*H04W 16/26* (2009.01)
*H04B 7/155* (2006.01)

(52) U.S. Cl.
CPC .......... *H04W 16/26* (2013.01); *H04B 7/1555* (2013.01); *H04B 7/15507* (2013.01)

(58) Field of Classification Search
USPC ...................................... 455/7–25
See application file for complete search history.

(56) References Cited

U.S. PATENT DOCUMENTS

| 5,347,286 A | 9/1994 | Babitch |
| 5,515,059 A | 5/1996 | How et al. |

(Continued)

FOREIGN PATENT DOCUMENTS

| CN | 102790277 A | 11/2012 |
| EP | 1 369 954 A3 | 10/2004 |
| KR | 2003-0019814 | 3/2003 |

OTHER PUBLICATIONS

Brown, Michael; "Meet 60Ghz Wi-Fi, the insanely fast future of wireless networking," PC World; http://www.pcworld.com/article/2030041/meet-60ghz-wi-fi-the-insanely-fast-future-of-wireless-networking.html, Mar. 6, 2013.

(Continued)

*Primary Examiner* — Fayyaz Alam

(57) ABSTRACT

Disclosed herein are example embodiments for portable wireless node auxiliary relay. For certain example embodiments, at least one device, such as an auxiliary relay item: (i) may serve as a relay between a portable wireless node and a fixed wireless node; or (ii) may communicate with at least one of a portable wireless node or a fixed wireless node using one or more antenna assembly configuration parameters that are associated with at least one orientation position. However, claimed subject matter is not limited to any particular described embodiments, implementations, examples, or so forth.

46 Claims, 28 Drawing Sheets

(56) References Cited

U.S. PATENT DOCUMENTS

| | | |
|---|---|---|
| 6,571,097 B1 | 5/2003 | Takai |
| 6,954,180 B1 | 10/2005 | Braun et al. |
| 6,980,782 B1 | 12/2005 | Braun et al. |
| 7,068,234 B2 | 6/2006 | Sievenpiper |
| 7,106,715 B1 | 9/2006 | Kelton et al. |
| 7,688,306 B2 | 3/2010 | Wehrenberg et al. |
| 7,978,063 B2* | 7/2011 | Baldus ............ A61B 5/0006 340/539.12 |
| 8,159,399 B2 | 4/2012 | Dorsey et al. |
| 8,217,843 B2 | 7/2012 | Shtrom et al. |
| 8,280,427 B2* | 10/2012 | Wang ................ H04W 52/16 370/310 |
| 8,548,525 B2 | 10/2013 | Wong et al. |
| 8,577,392 B1 | 11/2013 | Pai et al. |
| 8,618,937 B2 | 12/2013 | Rofougaran et al. |
| 8,792,414 B2 | 7/2014 | Kish |
| 2002/0147032 A1 | 10/2002 | Yoon et al. |
| 2003/0090418 A1 | 5/2003 | Howell |
| 2004/0204026 A1 | 10/2004 | Steer et al. |
| 2004/0259497 A1* | 12/2004 | Dent ................ H04B 7/18515 455/13.3 |
| 2005/0195103 A1 | 9/2005 | Davis et al. |
| 2005/0250543 A1 | 11/2005 | Thermond |
| 2006/0017692 A1 | 1/2006 | Wehrenberg et al. |
| 2006/0052112 A1 | 3/2006 | Baussi et al. |
| 2006/0148405 A1* | 7/2006 | Wu ................... H04M 1/7253 455/41.2 |
| 2006/0232468 A1 | 10/2006 | Parker et al. |
| 2007/0063911 A1 | 3/2007 | Davidson et al. |
| 2008/0074307 A1 | 3/2008 | Boric-Lubecke et al. |
| 2008/0077326 A1 | 3/2008 | Funk et al. |
| 2008/0096566 A1 | 4/2008 | Brunner et al. |
| 2008/0242354 A1 | 10/2008 | Rofougaran |
| 2008/0258971 A1 | 10/2008 | Nichols et al. |
| 2008/0304425 A1 | 12/2008 | Karaoguz |
| 2008/0311851 A1 | 12/2008 | Hansen et al. |
| 2009/0047950 A1 | 2/2009 | Doppler et al. |
| 2009/0212941 A1 | 8/2009 | Vock et al. |
| 2009/0231125 A1* | 9/2009 | Baldus ............ A61B 5/0006 340/539.12 |
| 2009/0325479 A1* | 12/2009 | Chakrabarti ......... H04B 7/0417 455/7 |
| 2010/0027518 A1 | 2/2010 | Wang |
| 2010/0080177 A1 | 4/2010 | Rofougaran |
| 2010/0177664 A1 | 7/2010 | Thoumy et al. |
| 2010/0188331 A1 | 7/2010 | Wehrenberg et al. |
| 2010/0194655 A1 | 8/2010 | Cook |
| 2010/0194663 A1 | 8/2010 | Rothwell et al. |
| 2010/0211777 A1 | 8/2010 | Ishihara et al. |
| 2010/0231453 A1 | 9/2010 | Shinkai et al. |
| 2010/0231473 A1 | 9/2010 | Shtrom et al. |
| 2010/0279751 A1 | 11/2010 | Pourseyed et al. |
| 2010/0297953 A1 | 11/2010 | Rofougaran |
| 2010/0309872 A1 | 12/2010 | Amini et al. |
| 2011/0063168 A1 | 3/2011 | Skarp |
| 2011/0090113 A1 | 4/2011 | Fenton |
| 2011/0105184 A1 | 5/2011 | Piirainen et al. |
| 2011/0143746 A1 | 6/2011 | Lehser |
| 2011/0151931 A1 | 6/2011 | Kish et al. |
| 2011/0207444 A1 | 8/2011 | Hansen et al. |
| 2011/0250928 A1 | 10/2011 | Schlub et al. |
| 2011/0273359 A1 | 11/2011 | Tischer et al. |
| 2011/0298672 A1 | 12/2011 | Otto et al. |
| 2011/0305175 A1 | 12/2011 | Hethuin et al. |
| 2011/0306306 A1 | 12/2011 | Reed |
| 2012/0009942 A1 | 1/2012 | Zoubir |
| 2012/0014367 A1 | 1/2012 | Caillerie et al. |
| 2012/0021693 A1 | 1/2012 | Wintzell et al. |
| 2012/0056784 A1 | 3/2012 | Xie et al. |
| 2012/0157120 A1 | 6/2012 | Hansen et al. |
| 2012/0182867 A1 | 7/2012 | Farrag et al. |
| 2012/0194399 A1 | 8/2012 | Bily et al. |
| 2012/0202560 A1 | 8/2012 | Donaldson |
| 2012/0299772 A1 | 11/2012 | Shtrom et al. |
| 2013/0040655 A1* | 2/2013 | Keidar ................ H01Q 1/245 455/456.1 |
| 2013/0045759 A1 | 2/2013 | Smith |
| 2013/0053061 A1 | 2/2013 | Kang et al. |
| 2013/0078908 A1* | 3/2013 | Smith ................... H04B 7/155 455/11.1 |
| 2013/0176161 A1 | 7/2013 | Derham et al. |
| 2013/0207806 A1* | 8/2013 | Lehmann ............ H04B 1/3838 340/600 |
| 2014/0051461 A1 | 2/2014 | Ranki et al. |
| 2014/0113671 A1 | 4/2014 | Schwengler |
| 2014/0120947 A1 | 5/2014 | Siomina |
| 2014/0153418 A1 | 6/2014 | Hariharan et al. |
| 2014/0211677 A1 | 7/2014 | Barbieri et al. |
| 2014/0274112 A1 | 9/2014 | Vitek et al. |
| 2014/0306843 A1 | 10/2014 | Merkel et al. |
| 2015/0030256 A1 | 1/2015 | Brady et al. |

OTHER PUBLICATIONS

PCT International Search Report; International App. No. PCT/US2014/027741; Jul. 28, 2014; 5 pages.

Teral, Stephanie; "Mobile Spectrum, Annual Market Size and Forecasts Analysis", Infonetics Research Inc., Feb. 18, 2013, pp. i-23.

Cisco, "Cisco Wireless LAN Controller Configuration Guide", Software Release 7.0; bearing a date of Jun. 2010; pp. 1-2, 4-68, 4-116, 7-17 and 12-34.

Nokia Corporation; "Linux Cross Reference"; Version 4.0; downloaded on May 28, 2015; pp. 1-24; Copyright 2009 © Nokia Corporation.

* cited by examiner

PORTABLE WIRELESS NODE AUXILIARY RELAY

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS (1) For purposes of the USPTO extra-statutory requirements, the present application constitutes a continuation-in-part of U.S. patent application Ser. No. 13/842,040, entitled "Frequency Accommodation", naming Roderick A. Hyde, Royce A. Levien, Richard T. Lord, Robert W. Lord, Mark A. Malamud, and Clarence T. Tegreene as inventors, filed 15 Mar. 2013, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/902,585, entitled "Facilitating Wireless Communication in Conjunction with Orientation Position", naming Roderick A. Hyde, Royce A. Levien, Richard T. Lord, Robert W. Lord, Mark A. Malamud, and Clarence T. Tegreene as inventors, filed 24 May 2013, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/904,970, entitled "Facilitating Wireless Communication in Conjunction with Orientation Position", naming Roderick A. Hyde, Royce A. Levien, Richard T. Lord, Robert W. Lord, Mark A. Malamud, and Clarence T. Tegreene as inventors, filed 29 May 2013, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/936,921, entitled "Supporting Antenna Assembly Configuration Network Infrastructure", naming Roderick A. Hyde, Royce A. Levien, Richard T. Lord, Robert W. Lord, Mark A. Malamud, and Clarence T. Tegreene as inventors, filed 8 Jul. 2013, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/945,801, entitled "Portable Wireless Node Local Cooperation", naming Roderick A. Hyde, Royce A. Levien, Richard T. Lord, Robert W. Lord, Mark A. Malamud, and Clarence T. Tegreene as inventors, filed 18 Jul. 2013, which is currently co-pending or is an application of which a currently co-pending application is entitled to the benefit of the filing date.

RELATED APPLICATIONS (1) U.S. patent application Ser. No. 13/317,338, entitled "Surface Scattering Antennas", naming Adam Bily, Anna K. Boardman, Russell J. Hannigan, John Hunt, Nathan Kundtz, David R. Nash, Ryan Allan Stevenson, and Philip A. Sullivan as inventors, filed 14 Oct. 2011, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

DETAILED DESCRIPTION

Figure 1:
FIG. 1 is a block diagram indicative of a spatial relationship or interconnectedness of drawing sheets that respectively correspond to FIGS. 1A-1L, which together depict at least an example enviro-system related to certain example embodiments.
Figure 1A:
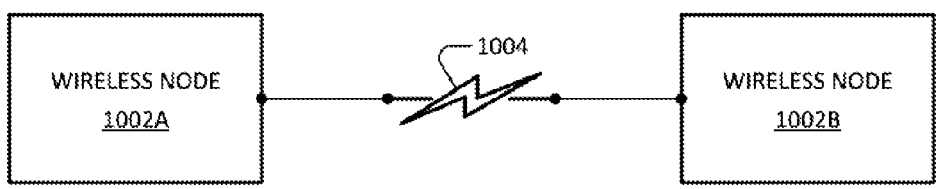
FIG. 1A is a schematic diagram of example wireless nodes in accordance with certain example embodiments.
Figure 1A:
Figure 1B:
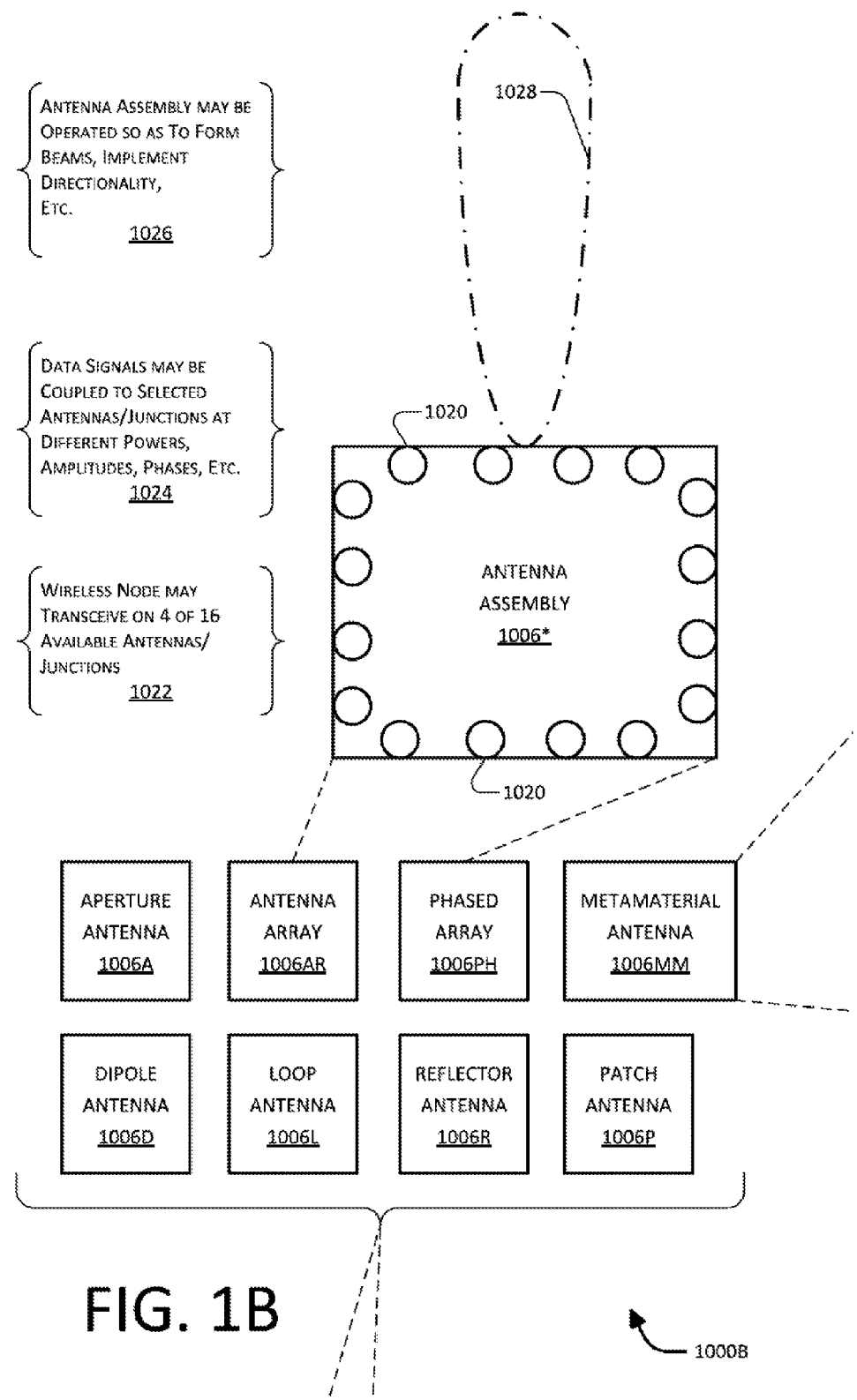
FIGS. 1B-1L are individual schematic diagrams that may be combined to form a joint schematic diagram illustrating example implementations for accommodating one or more different frequencies in a wireless environment in accordance with certain example embodiments.
Figure 1C:
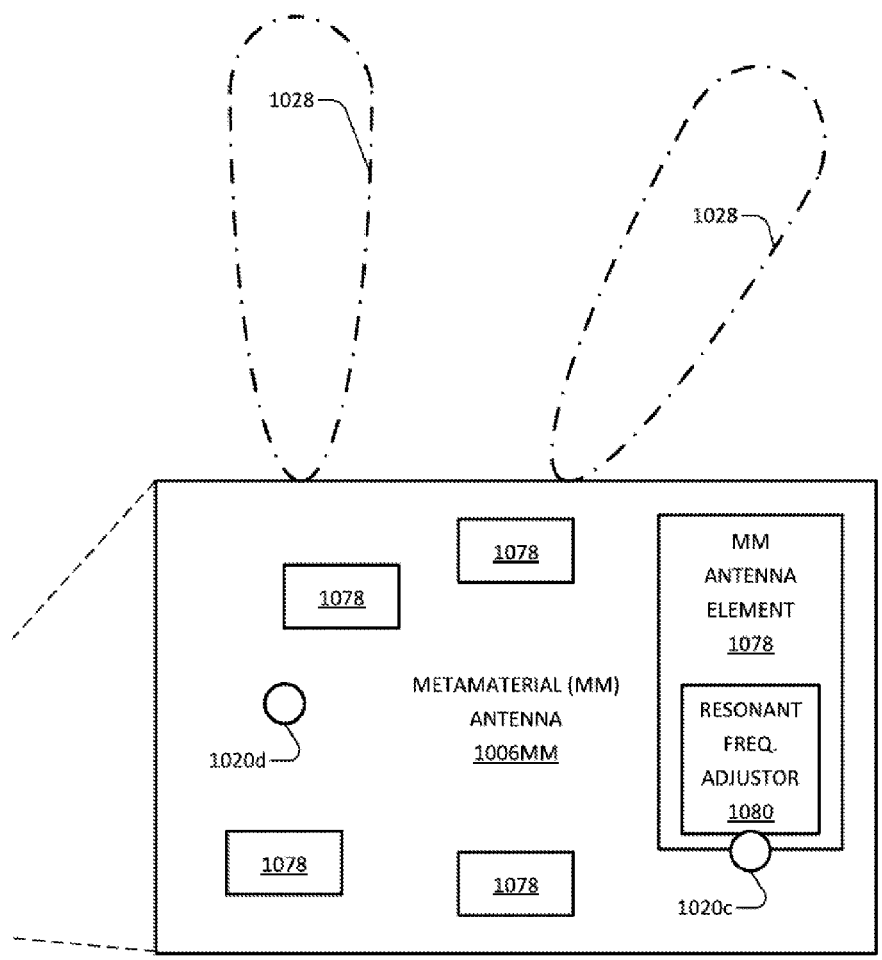
Figure 1D:
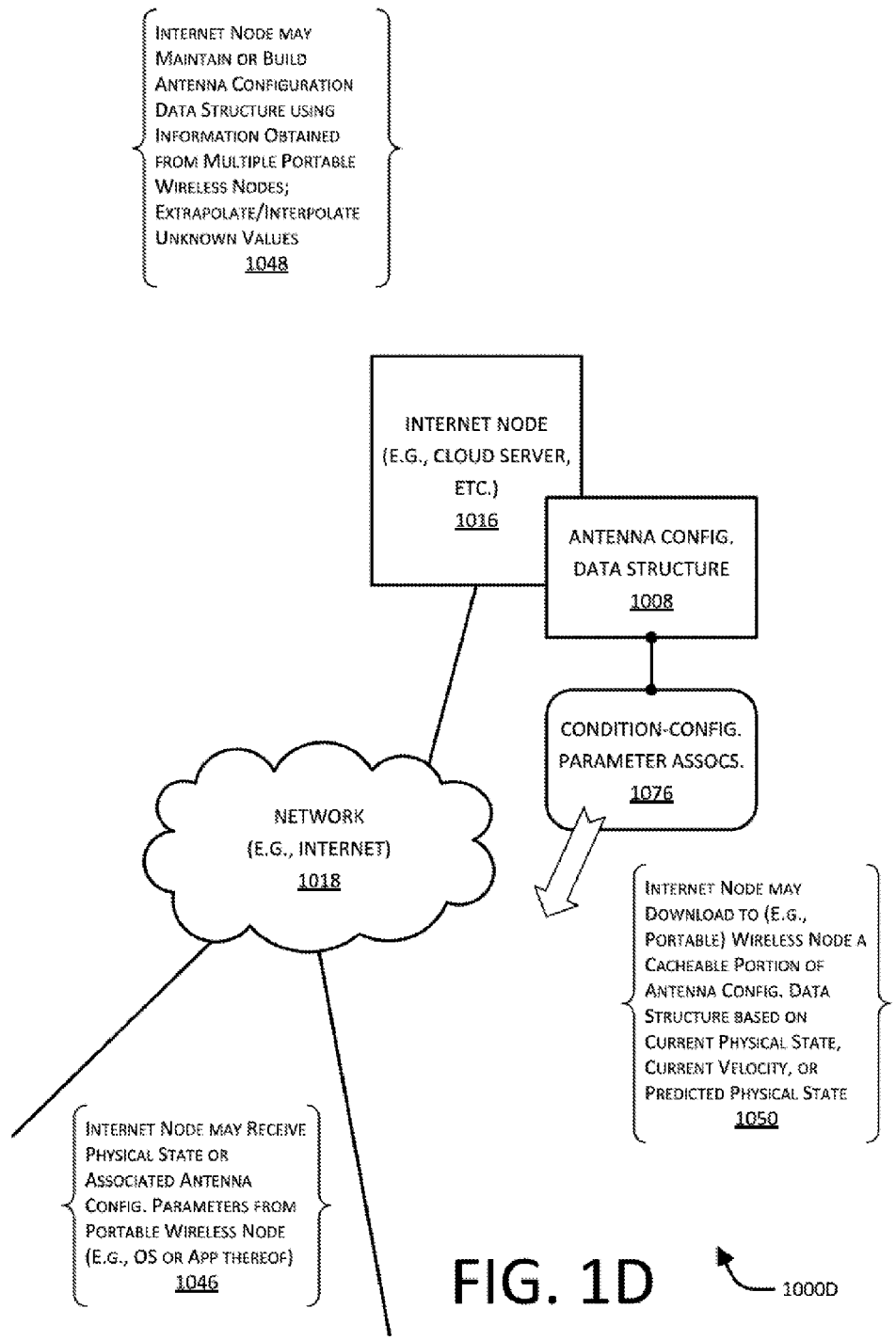

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

For certain example embodiments, one or more wireless communication parameters may be adopted by a mobile device based at least partially on a physical state of a mobile device to strengthen, enhance, improve, or a combination thereof, etc. a communication channel between a mobile device and another wireless device, such as a base station. Additionally or alternatively, a physical state of (e.g., a location of or an orientation of) a mobile device may be altered to strengthen, enhance, improve, or a combination thereof, etc. a communication channel between a mobile device and an another device, such as a base station (e.g., orientation of at least one communicating device may be altered to strengthen, enhance, improve, or a combination thereof, etc. a communication channel between/among one or more wireless devices).

For certain example embodiments, a physical state of a mobile device may include a spatial location of the mobile device or an orientation of the mobile device. For certain example implementations, a spatial location (e.g., which may be merged with or incorporated into or linked to 3-D mapping data, including those of buildings) may be represented with a geographical position of a mobile device (e.g., with regard to a point on the earth) or an elevation of a mobile device (e.g., with regard to a height above the earth). For certain example implementations, an orientation may be represented with (1) Euler angles or rotations or (2) pitch, roll, or yaw in 3-D Euclidean space.

For certain example embodiments, one or more wireless communication parameters, such as one or more antenna assembly configuration parameters, may include, but are not limited to any one or more of the following. First, an antenna element set may be selected from among multiple antenna elements of an antenna array. Second, a particular phase or delay may be applied to each antenna element of a selected set of antenna elements. Third, a particular power may be applied to each antenna element of a selected set of antenna elements. Fourth, a phased array antenna (e.g., which may be formed from multiple antenna elements comprising or including a single dipole) may include multiple antenna elements that are driven with particular signal values. For instance, different elements (e.g., if an element is covered/blocked), phases/delays, power, or a combination thereof, etc. may be applied to input/output connections of a phased array antenna (e.g., to establish or form a beam). Antennas, including but not limited to antenna arrays or phased arrays, may comprise or include or be formed or constructed using meta-materials. Fifth, a frequency of wireless signal(s) coupled to or from an antenna may be adjusted. Sixth, a frequency band or a wireless communication standard that is being employed may be altered, including but not limited to using a different antenna to support a different frequency band or wireless communication standard.

Figure 1E:
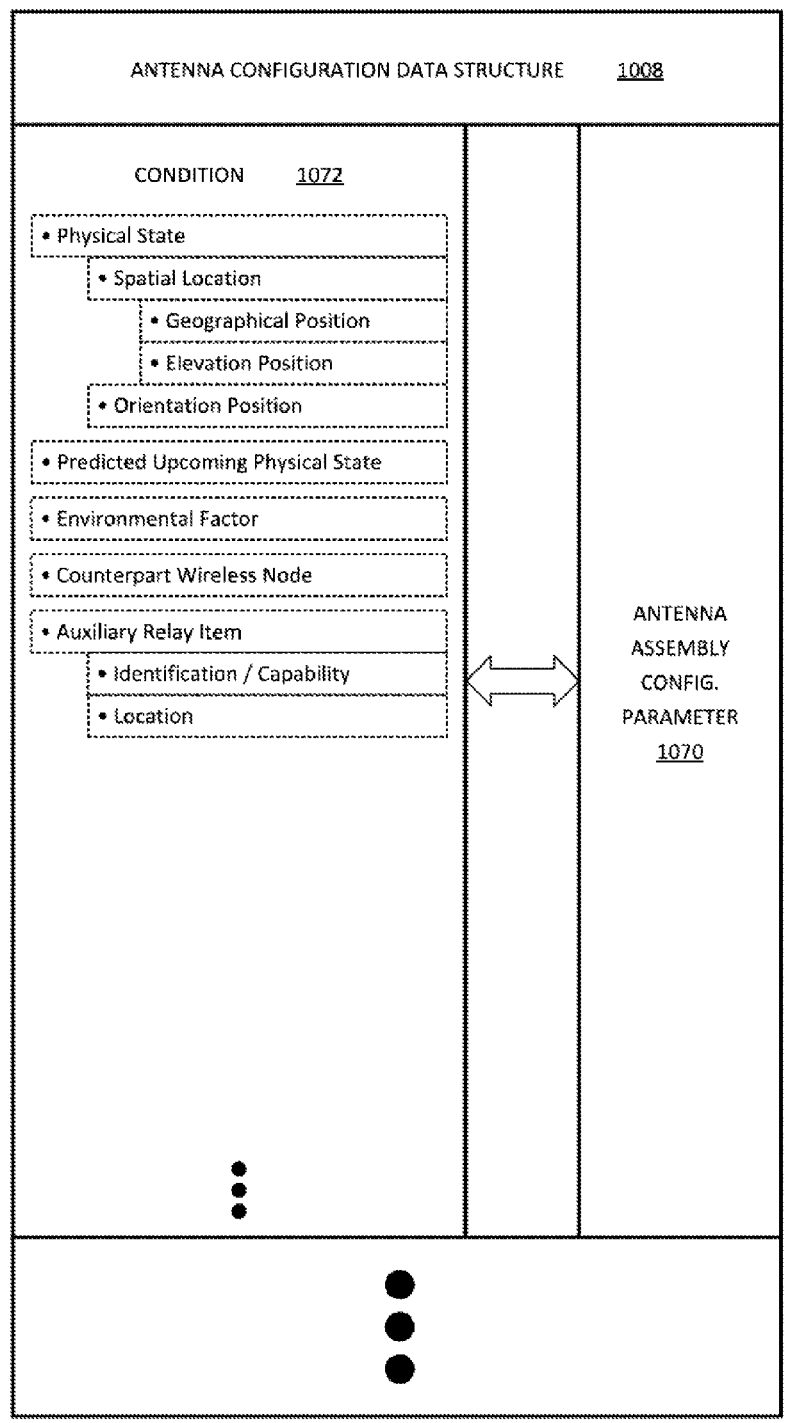
Figure 1F:
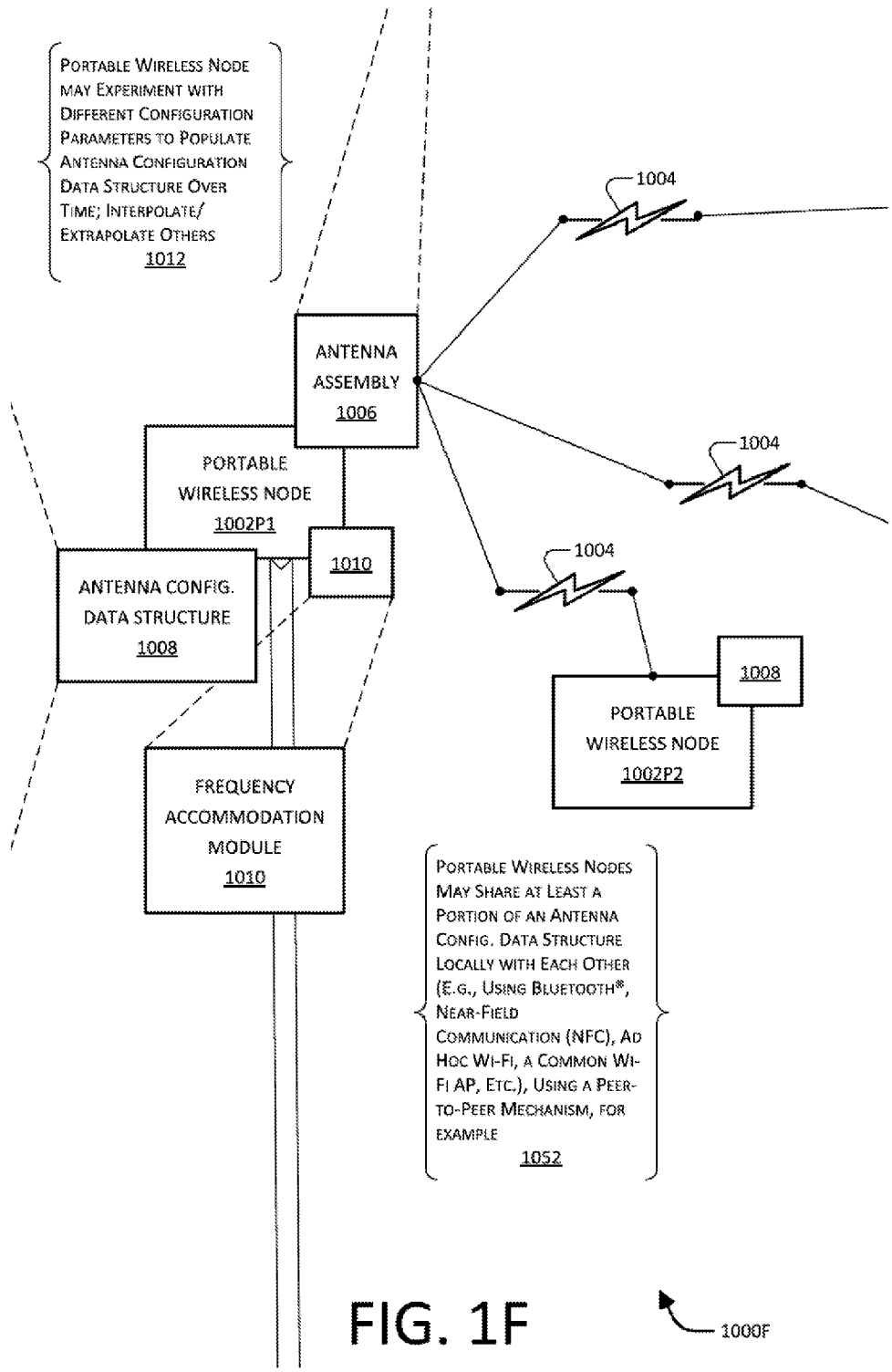
Figure 1G:
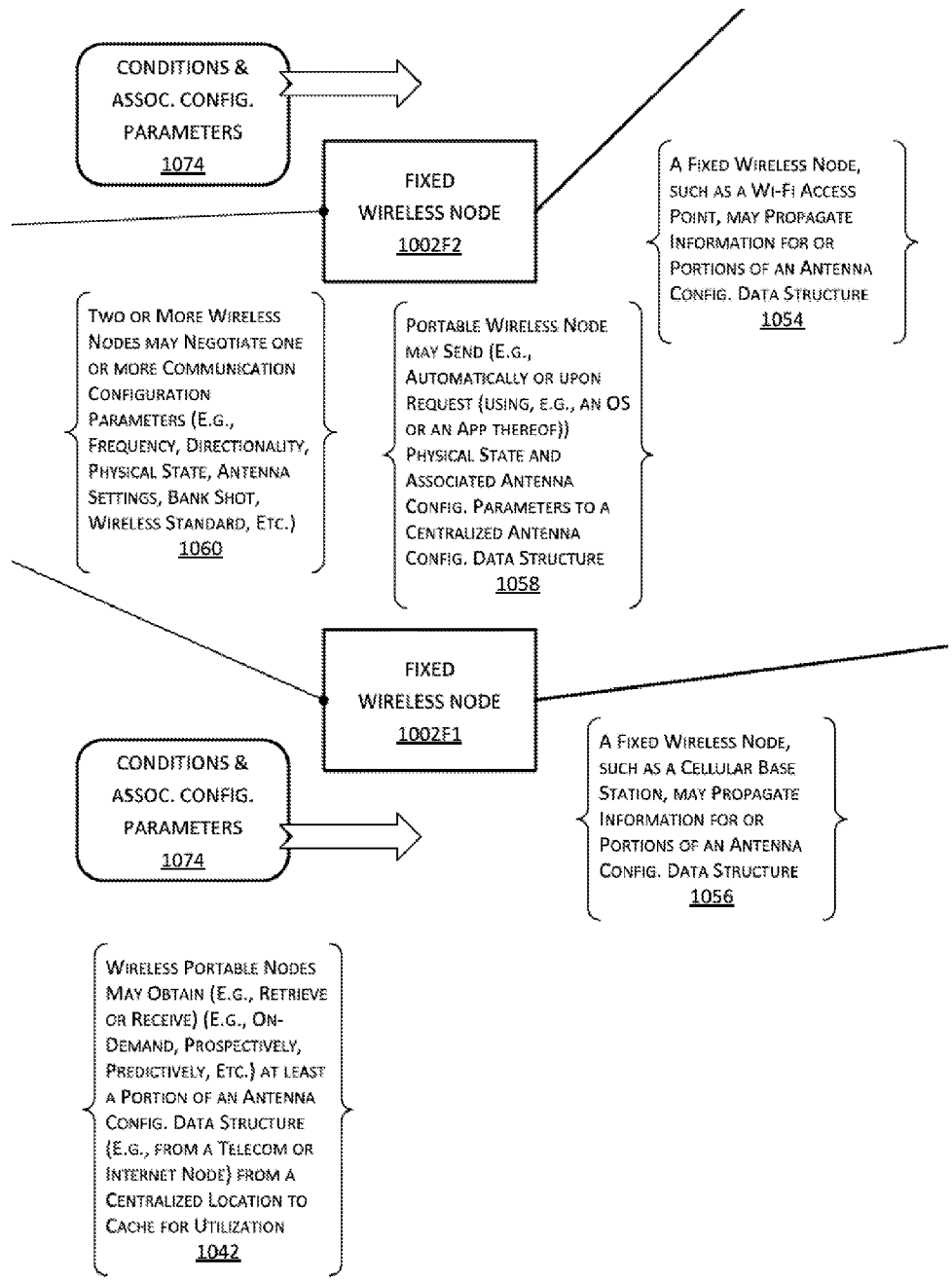
Figure 1H:
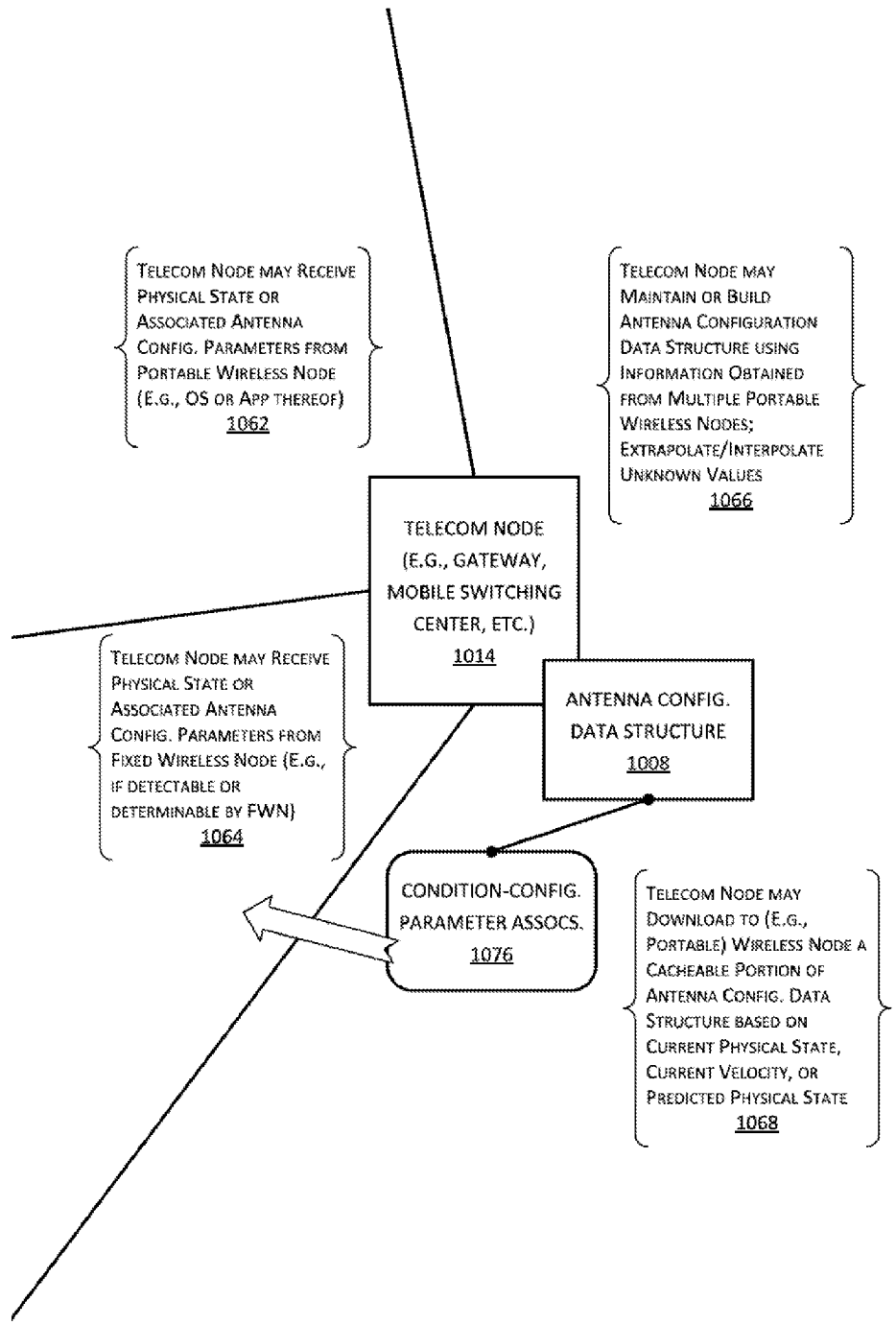
Figure 1I:
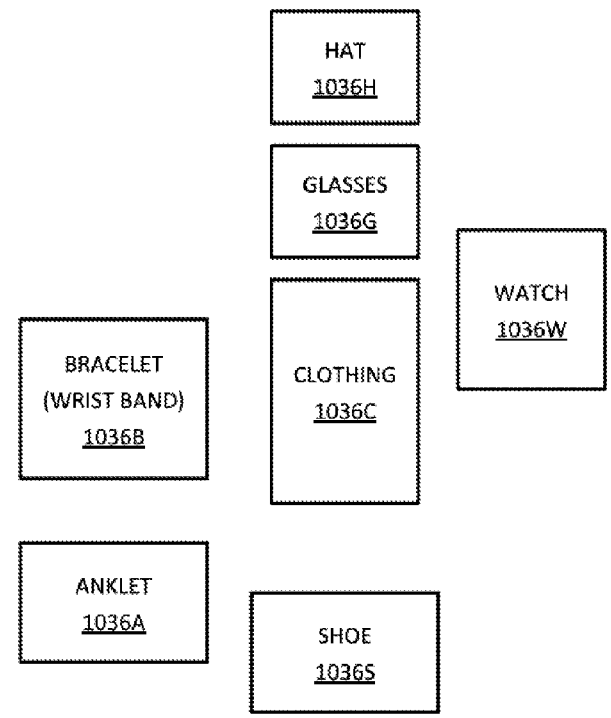
Figure 1I:
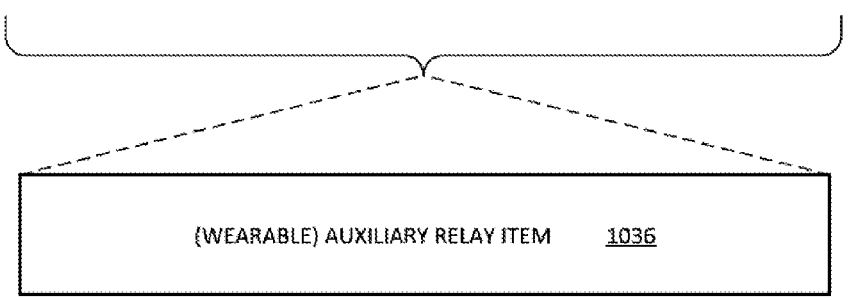
Figure 1I:
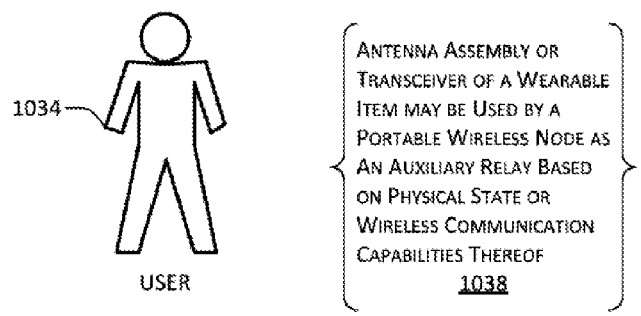
Figure 1J:
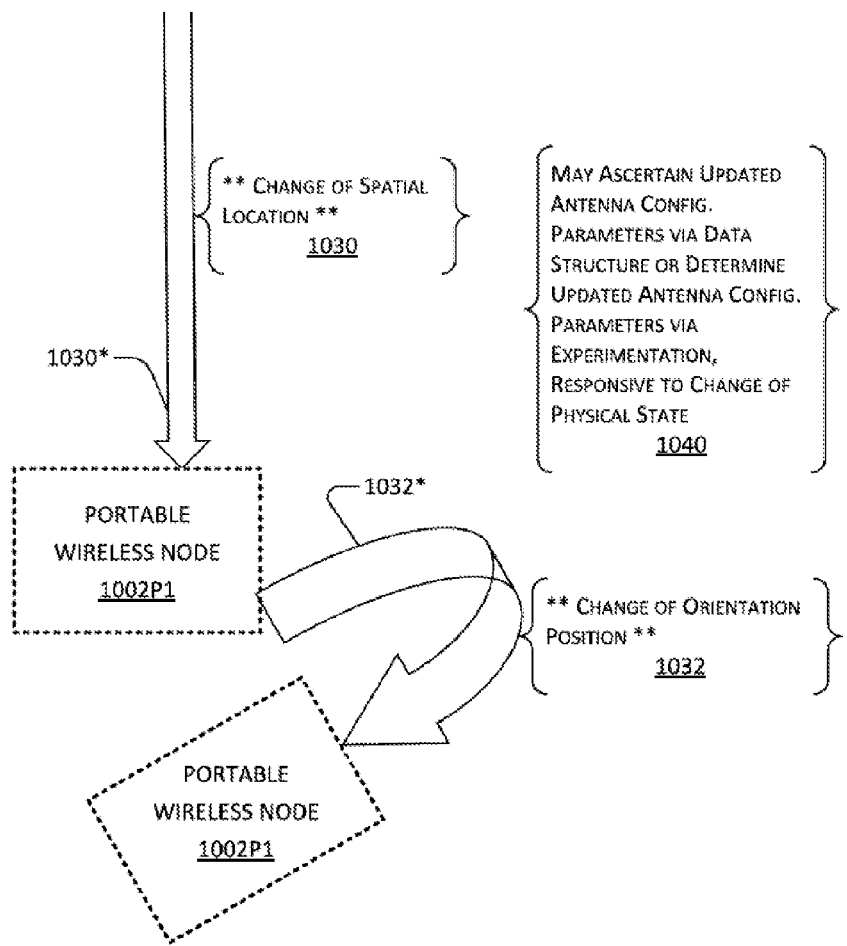
Figure 1K:
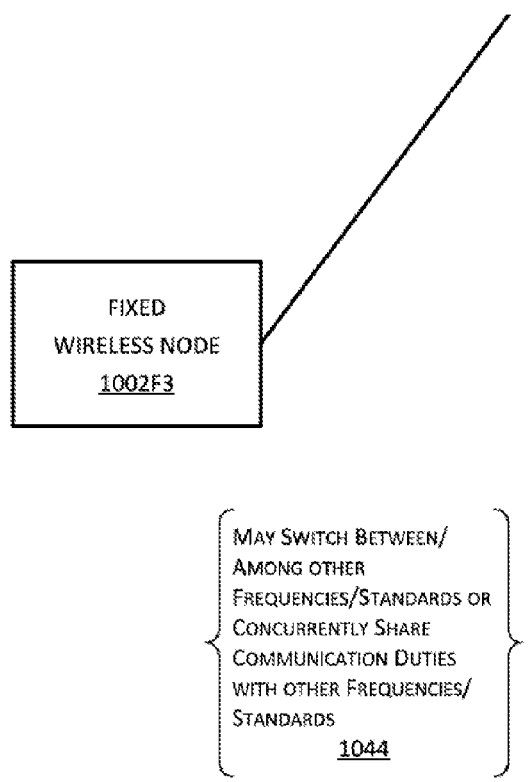
Figure 1L:
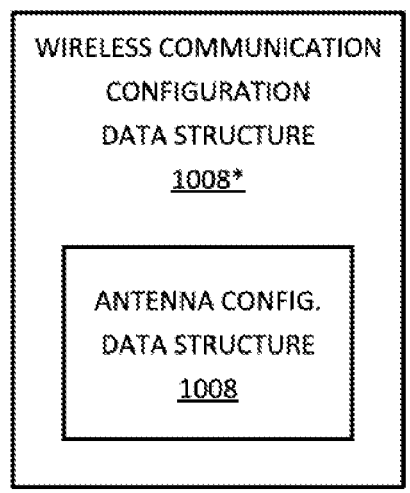
Figure 2:
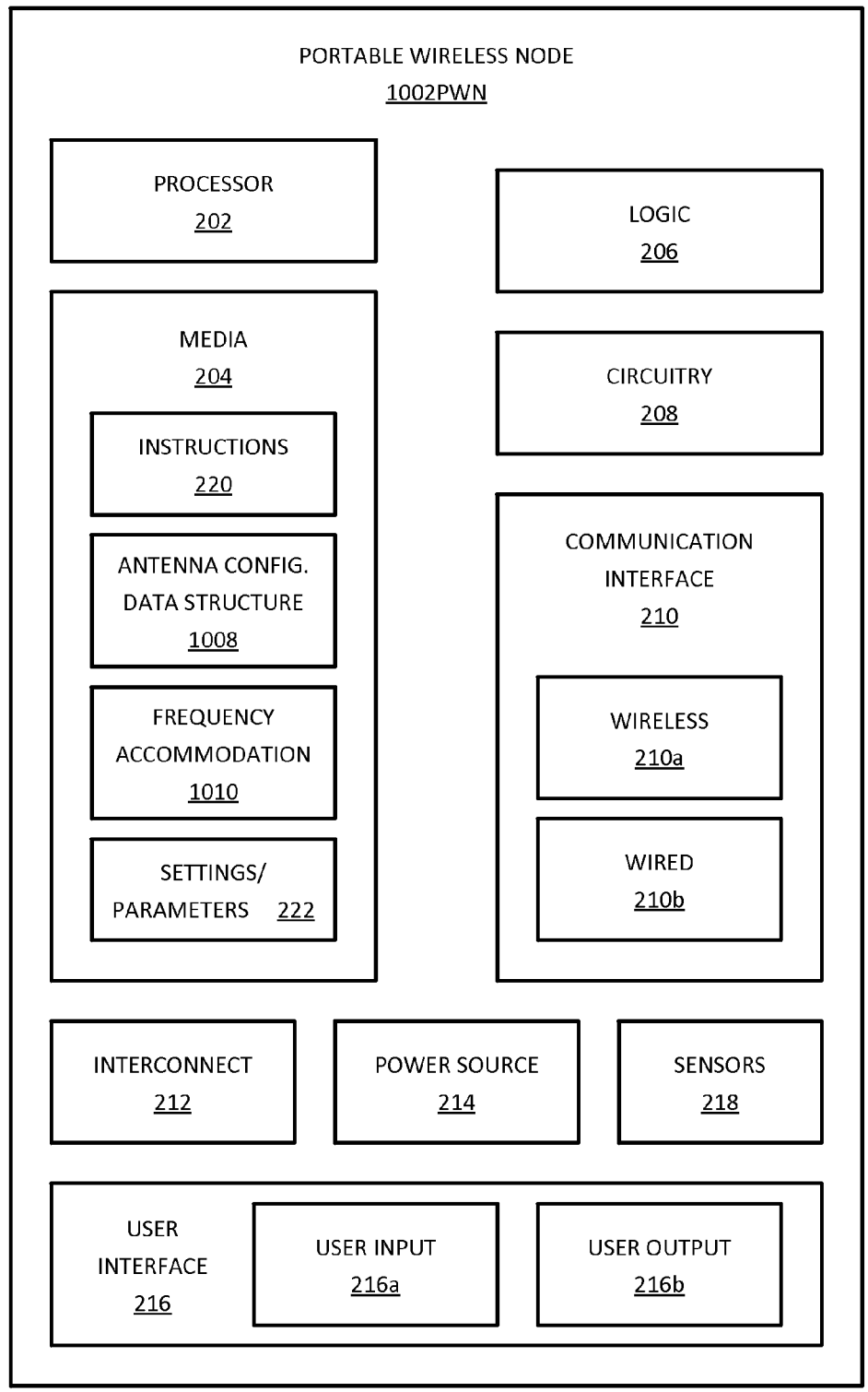
FIG. 2 is a schematic diagram of an example portable wireless node including one or more example components in accordance with certain example embodiments.
Figure 3:
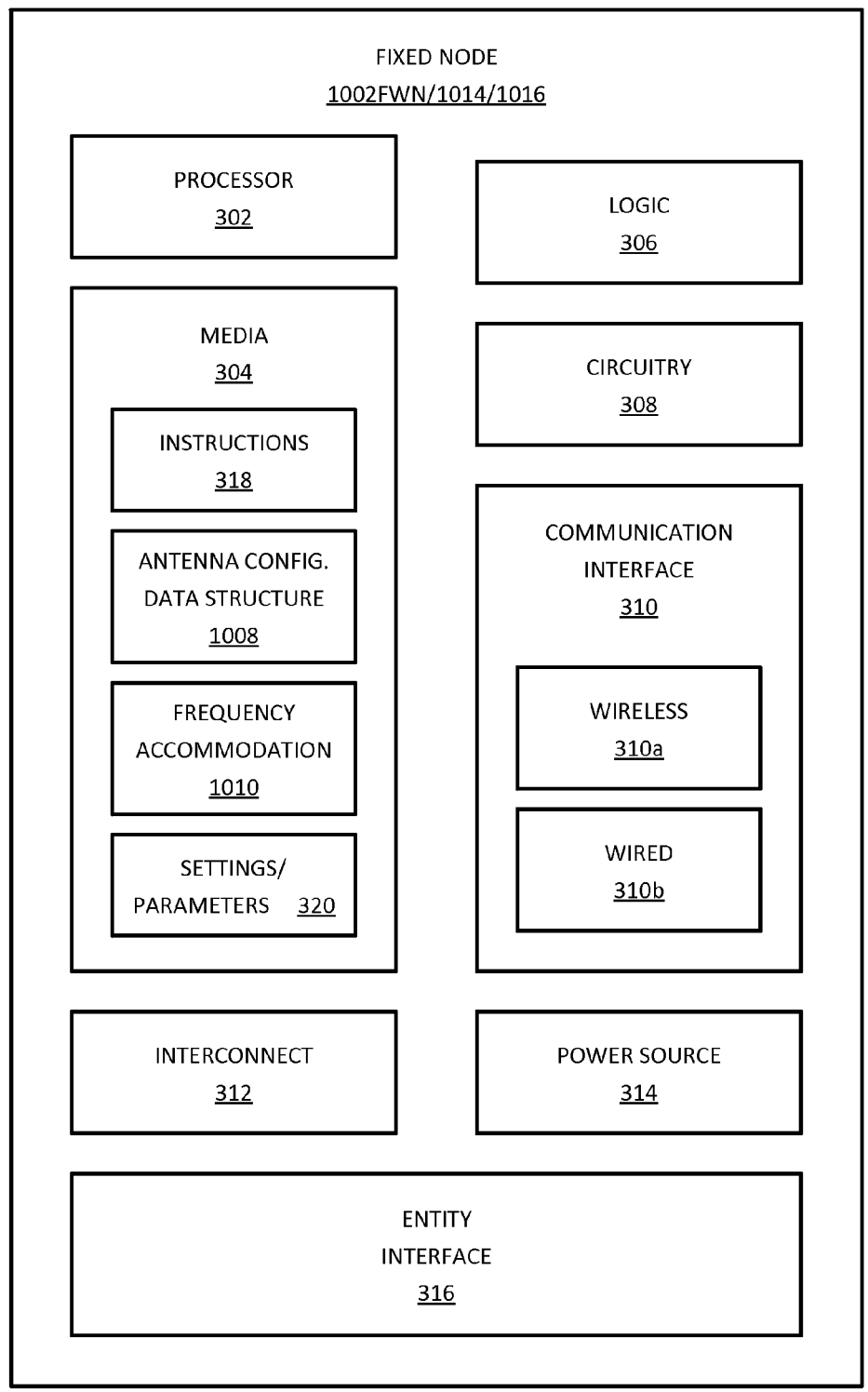
FIG. 3 is a schematic diagram of an example fixed node, such as a fixed wireless node or a fixed wired node, including one or more example components in accordance with certain example embodiments.

APPLICANT HEREBY INCORPORATES BY REFERENCE HEREIN DESCRIPTION OF AND TEXT ASSOCIATED WITH FIGS. 1-3 (E.G., FIGS. 1, 1A, 1B, 1C, 1D, 1E, 1F, 1G, 1H, 1I, 1J, 1K, 1L, 2, AND 3), INCLUDING BUT NOT LIMITED TO PARAGRAPHS [0017]-[0092] INCLUSIVE IN THEIR ENTIRETY, AT LEAST TO THE EXTENT SUCH SUBJECT MATTER IS NOT INCONSISTENT HEREWITH, OF U.S. application Ser. No. 13/842,040, entitled "Frequency Accommodation", naming Roderick A. Hyde et al. as inventors, filed 15 Mar. 2013.

Figure 4A:
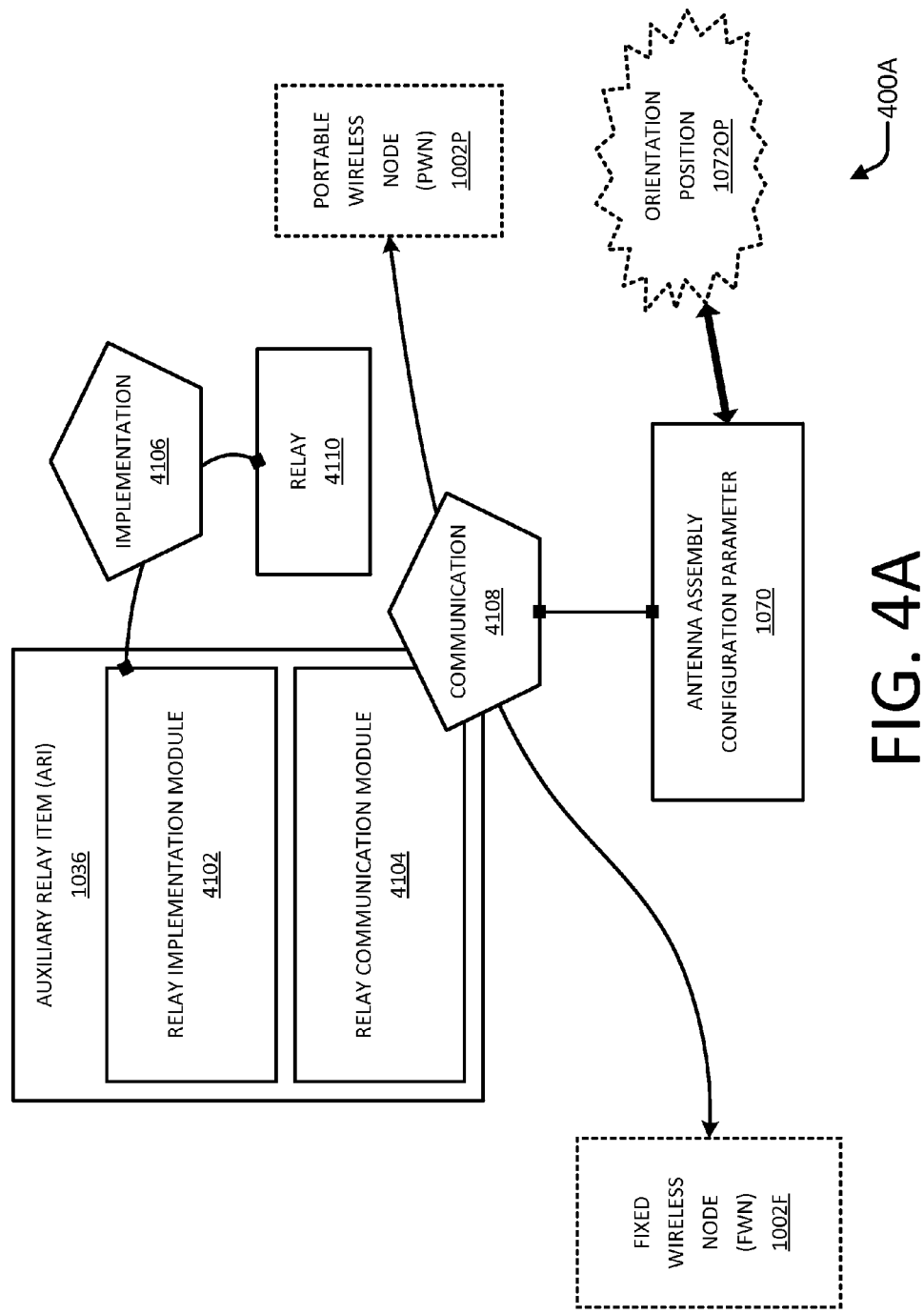
FIG. 4A is a schematic diagram that includes at least one example device, such as an auxiliary relay item, that is capable of handling scenarios for portable wireless node auxiliary relay in accordance with certain example embodiments.

FIG. 4A is a schematic diagram 400A that includes at least one example device, such as an auxiliary relay item, that is capable of handling scenarios for portable wireless node auxiliary relay in accordance with certain example embodiments. As shown in FIG. 4A, by way of example but not limitation, schematic diagram 400A depicts at least one device that may include or comprise at least one auxiliary relay item (ARI) 1036. More specifically, schematic diagram 400A depicts at least one auxiliary relay item 1036 that may include at least one relay implementation module 4102 or at least one relay communication module 4104. Additionally or alternatively, schematic diagram 400A may include, by way of example but not limitation, at least one implementation 4106, at least one communication 4108, at least one relay 4110, at least one antenna assembly configuration parameter

1070, at least one orientation position 1072OP, at least one portable wireless node (PWN) 1002P, or at least one fixed wireless node (FWN) 1002F. By way of example but not limitation, a relay implementation module 4102 or a relay communication module 4104 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein (including, but not limited to, description of example components for a portable wireless node (e.g., of FIG. 2)). However, claimed subject matter is not limited to any particular described embodiments, implementations, examples, etc.

For certain example embodiments, a relay implementation module 4102 or a relay communication module 4104 may be implemented separately or at least partially jointly or in combination with or by at least one auxiliary relay item (ARI) 1036. For certain example implementations, a relay implementation module 4102 may be configured to serve (e.g., via at least one implementation 4106) as a relay between a portable wireless node and a fixed wireless node. For certain example implementations, a relay communication module 4104 may be configured to communicate (e.g., via at least one communication 4108) with at least one of a portable wireless node or a fixed wireless node using one or more antenna assembly configuration parameters that are associated with at least one orientation position.

Figure 4B:
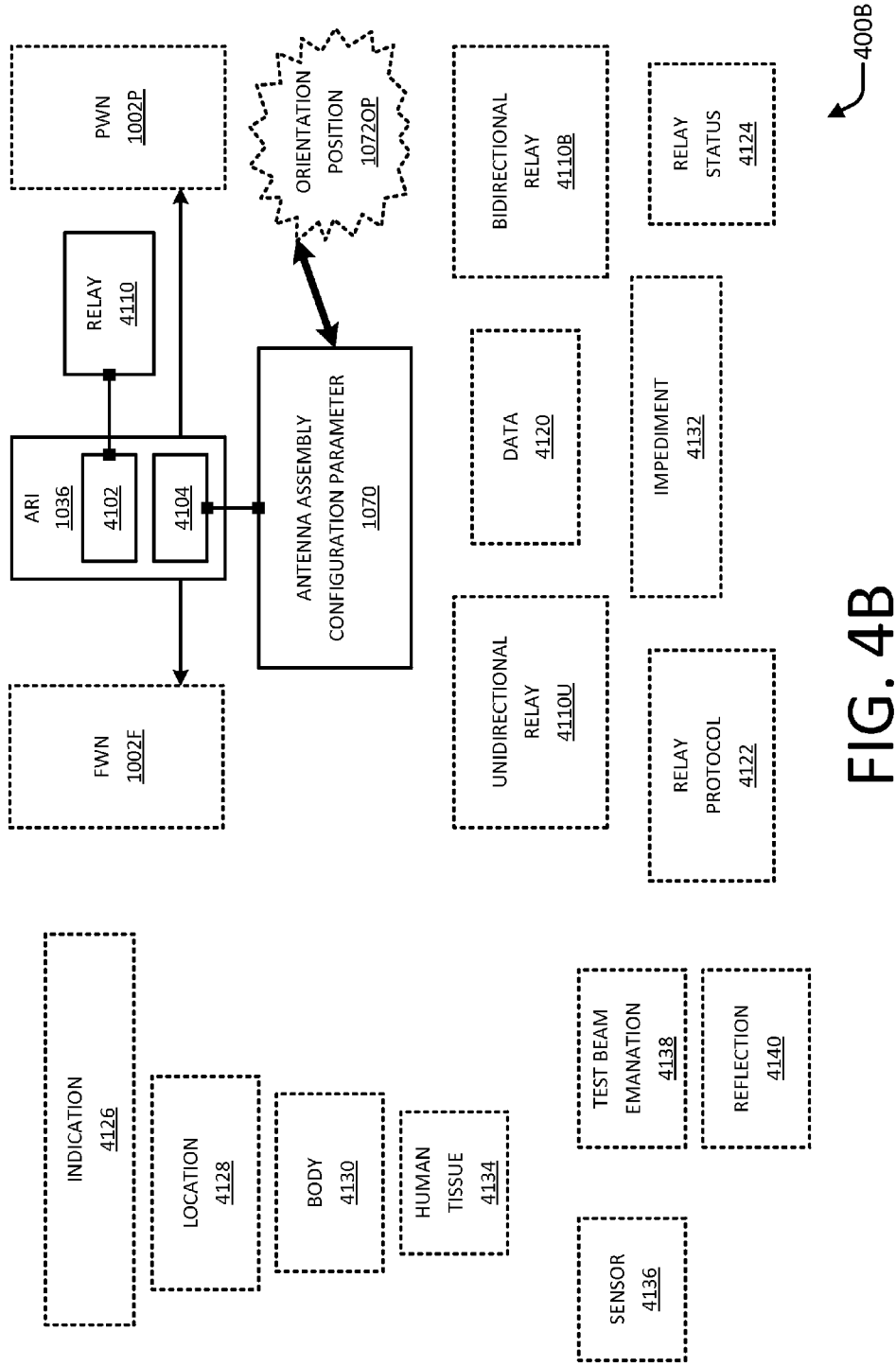
FIGS. 4B-4C are schematic diagrams that include at least one example device and that depict example scenarios for portable wireless node auxiliary relay in accordance with certain example embodiments.
Figure 4C:
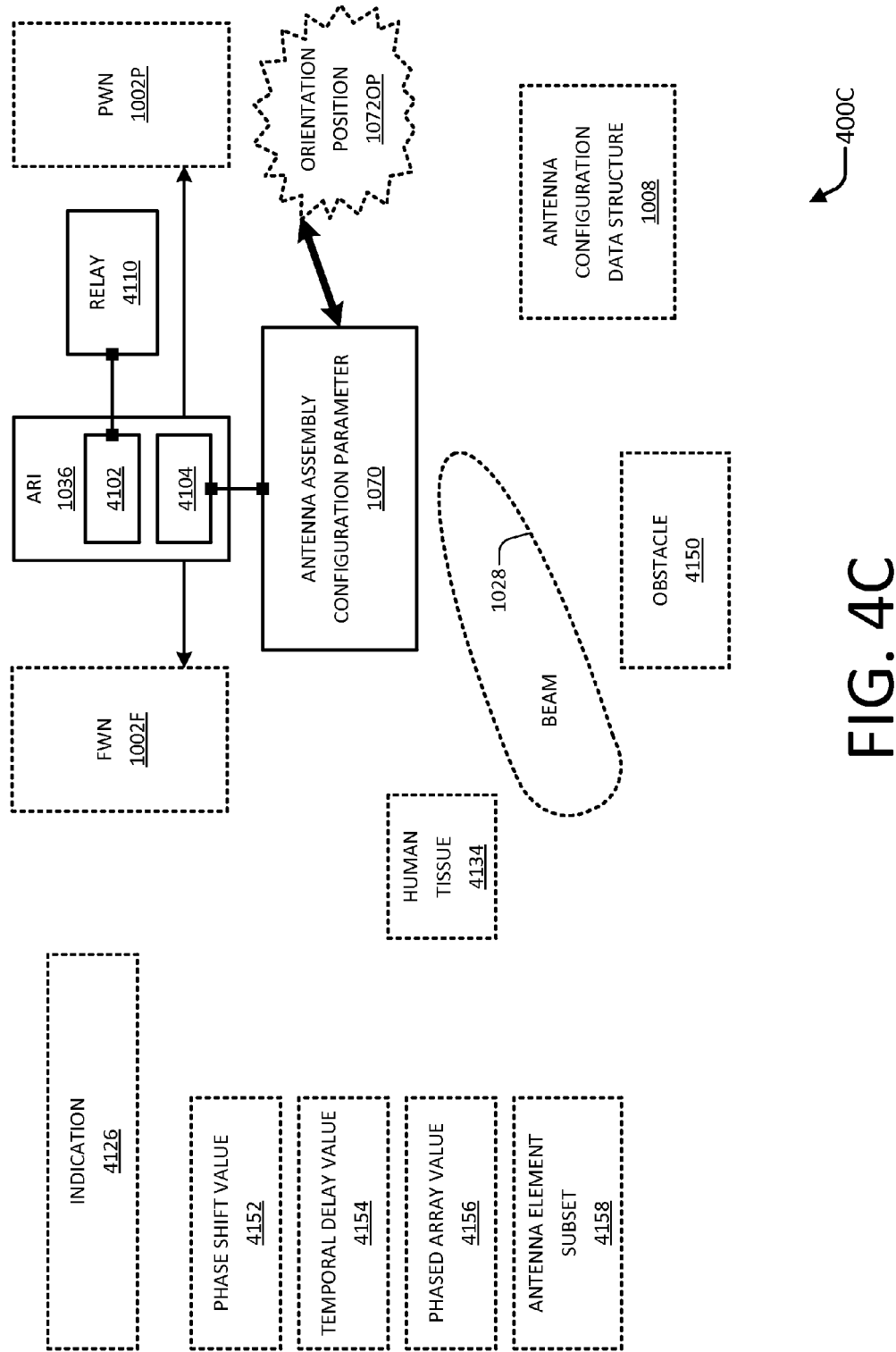

FIGS. 4B-4C are schematic diagrams 400B-400C that include at least one example device and that depict example scenarios for portable wireless node auxiliary relay in accordance with certain example embodiments. As shown in FIGS. 4B-4C, by way of example but not limitation, one or more of schematic diagrams 400B-400C may include at least one auxiliary relay item (ARI) 1036, at least one relay implementation module 4102, at least one relay communication module 4104, at least one relay 4110, at least one antenna assembly configuration parameter 1070, at least one orientation position 10720P, at least one portable wireless node (PWN) 1002P, or at least one fixed wireless node (FWN) 1002F. Each of schematic diagrams 400B-400C may include alternative or additional depictions, which may relate to portable wireless node auxiliary relay, as described herein. In addition to or in alternative to description herein below with specific reference to FIGS. 4B-4C, illustrated aspects of schematic diagrams 400B-400C may be relevant to example description with reference to any one or more of FIG. 5 or 6A-6G. However, claimed subject matter is not limited to any particular described embodiments, implementations, examples, etc.

As shown in FIG. 4B, by way of example but not limitation, schematic diagram 400B may further include at least one unidirectional relay 4110U, at least some data 4120, at least one bidirectional relay 4110B, at least one relay protocol 4122, at least one relay status 4124, at least one indication 4126, at least one location 4128, at least one body 4130, at least one impediment 4132, at least some human tissue 4134, at least one sensor 4136, at least one test beam emanation 4138, or at least one reflection 4140. Additional or alternative description that may be relevant to schematic diagram 400B is provided herein below with particular reference to one or more of any of FIGS. 6A-6G.

With reference to FIG. 1E, an antenna configuration data structure 1008 is illustrated. For certain example embodiments, one or more conditions 1072 may be associated with one or more antenna assembly configuration parameters 1070. Examples of conditions 1072 may include, but are not limited to, a physical state of a wireless node, a predicted upcoming physical state, an environmental factor, a counterpart wireless node (e.g., a wireless node with which communication is to be engaged), an auxiliary relay item, some combination thereof, or so forth. Additional or alternative condition 1072 examples are described herein below. For certain example implementations, a physical state may include a spatial location (e.g., which may change with a translational movement) or an orientation position (e.g., which may change with a rotational movement) (e.g., represented by Euler angles, Tait-Bryan angles, another parametrization, or a combination thereof, etc.). A spatial location may include a geographical position (e.g., location on an indoor or outdoor map, satellite positioning system (SPS) coordinates—such as GPS coordinates, distance plus direction with respect to a known location—such as a landmark or other wireless node, or a combination thereof, etc.), an elevation position (e.g., an altitude above the earth, a floor of a building, or a combination thereof, etc.), some combination thereof, or so forth. For certain example implementations, an auxiliary relay item field may include an identification/capability field (e.g., availability, description, identifying code, frequency band capability, transmit power capability, compatible standards, remaining battery power, or a combination thereof, etc.), a location field (e.g., placement on body, position relative to portable wireless node—such as direction or distance, or a combination thereof, etc.), some combination thereof, or so forth. However, claimed subject matter is not limited to any particular described embodiments, implementations, examples, etc.

With reference to FIG. 1l, a user 1034 (e.g., a person) may wear an auxiliary relay item 1036. For certain example embodiments, a (wearable) auxiliary relay item 1036 may be donned by, worn by, or adorning a person for protection, warmth, style, aesthetics, functionality, ornamentation, a combination thereof, or so forth. An auxiliary relay item 1036 may function to repeat a signal, expand antenna options, increase instantaneous transmit power, increase battery storage potential, a combination thereof, or so forth. Examples of auxiliary relay items 1036 may include, but are not limited to, a hat 1036H, glasses 1036G, clothing 1036C (e.g., pants, shirt, jacket, belt, dress, or a combination thereof, etc.), a shoe 1036S, a watch 1036W, a bracelet 1036B (including a wrist band), an anklet 1036A, some combination thereof, or so forth. For certain example implementations, as indicated at description 1038, an antenna assembly or a transceiver of a wearable auxiliary relay item 1036 may be used by a portable wireless node 1002P1 as a separate or additional node or path or option to propagate a signal based at least partially on a physical state of an auxiliary relay item, on wireless communication capabilities of an auxiliary relay item, some combination thereof, or so forth. By way of example only, if a portable wireless node does not have a clear (e.g., line-of-sight, unblocked, sufficiently non-attenuated, or a combination thereof, etc.) path to a targeted fixed wireless node but an auxiliary relay item does have a clear path, a (e.g., shorter-range, direct, clear path, or a combination thereof, etc.) signal may be established between the portable wireless node and the auxiliary relay item with the auxiliary relay item then handling a link/hop/step/etc. to the targeted fixed wireless node. However, claimed subject matter is not limited to any particular described embodiments, implementations, examples, etc.

For certain example embodiments, a portable wireless node may account for or address environmental factors or concerns pertinent to wireless communication at, e.g., EHF.

For certain example implementations, to avoid transmission through a human body, human tissue (e.g., hand, head, or a combination thereof, etc.) may be detected using one or more of the following: (a) test beam emanation (e.g., analyze reflections from test beams), (b) a capacitive sensor (e.g., of a touchscreen), (c) a proximity detector (e.g., a light sensor), (d) a pressure sensor (e.g., determine where finger tips are placed), (e) a sound sensor (e.g., determine where a user's mouth is located), some combination thereof, or so forth.

For certain example embodiments, a portable wireless node may interact with at least one auxiliary relay item 1036. Examples may include, but are not limited to, a bracelet, an anklet, glasses, a watch, some combination thereof, or so forth. For certain example implementations, an auxiliary relay item 1036 may be engaged or utilized for any one or more of the following reasons: (a) a clearer path to another wireless node (e.g., to avoid a head or other human tissue or another blocking object), (b) more power availability, (c) more or differently-arranged antenna elements on the auxiliary relay item, (d) a different available frequency or wireless communication standard, some combination thereof, or so forth. By way of example only, a portable wireless node may roll over to an auxiliary relay item to relocate transmission power away from a head or if throughput drops where a user is currently holding a portable wireless node. For certain example implementations: (1) a portable wireless node may select between or among one or more auxiliary relay items (e.g., may determine when it is advisable to fallback to an auxiliary relay item using a protocol for communication between a mobile device and an auxiliary relay item); (2) an auxiliary relay item may be creating/using/updating an antenna configuration data structure in conjunction with or independent of a portable wireless node; (3) a spatial location of a wearable auxiliary relay item may be determine based at least partly on an attachment site to a body part; (4) a system may automatically determine presence/absence or location of wearable auxiliary relay items; (5) searches for suitable antenna configuration parameters by an auxiliary relay item may be constrained by battery power (e.g., power/battery-related technology described herein with respect to a portable wireless node may be applied to an auxiliary relay item, unless context dictates otherwise); (6) if multiple items are linked so as to enable or merely enhance communication or user functions if they are working together, then one or more of the multiple items may alert (e.g., visually, audibly, haptically, or a combination thereof, etc.) if they are separated from each other beyond a threshold distance (e.g., beyond a range which enables using them together, such as if a user is driving away from a house with one of two interacting components); some combination thereof; or so forth.

For certain example embodiments, technologies described herein may be directly apparent to a user in one or more ways. For certain example implementations, a portable wireless node may offer a user one or more settings: (a) a size of a data structure being cached, (b) a slider or other mechanism to indicate between battery consumption versus signal acquisition or enhancement, (c) a slider or other mechanism to indicate between an acceptable energy radiation level (e.g., exposure to a body or head portion thereof) versus signal quality or bandwidth throughput, (d) ability to activate/sync/configure an auxiliary relay item (e.g., input a type), some combination thereof, or so forth. For certain example implementations, a user may indicate a desire to be notified of (e.g., via at least one setting): (a) a position or orientation option for a portable wireless node that offers improved communication (e.g., more bandwidth, less power, less interference, lower cost, or a combination thereof, etc.), (b) an impending signal loss (e.g., if movement continues along a current direction based on signal degradation or entries in an antenna configuration data structure), some combination thereof, or so forth. For certain example implementations, notifications may be delivered by a portable wireless node to a user audibly, haptically, visually, or a combination thereof, etc. for indicating a different position/orientation, impending signal loss, some combination thereof, or so forth.

As shown in FIG. 4C, by way of example but not limitation, schematic diagram 400C may further include at least one antenna beam 1028, at least one obstacle 4150, at least some human tissue 4134, at least one indication 4126, at least one phase shift value 4152, at least one temporal delay value 4154, at least one phased array value 4156, at least one antenna element subset 4158, or at least one antenna configuration data structure 1008. Additional or alternative description that may be relevant to schematic diagram 400C is provided herein below with particular reference to one or more of any of FIGS. 6A-6G.

Figure 4D:
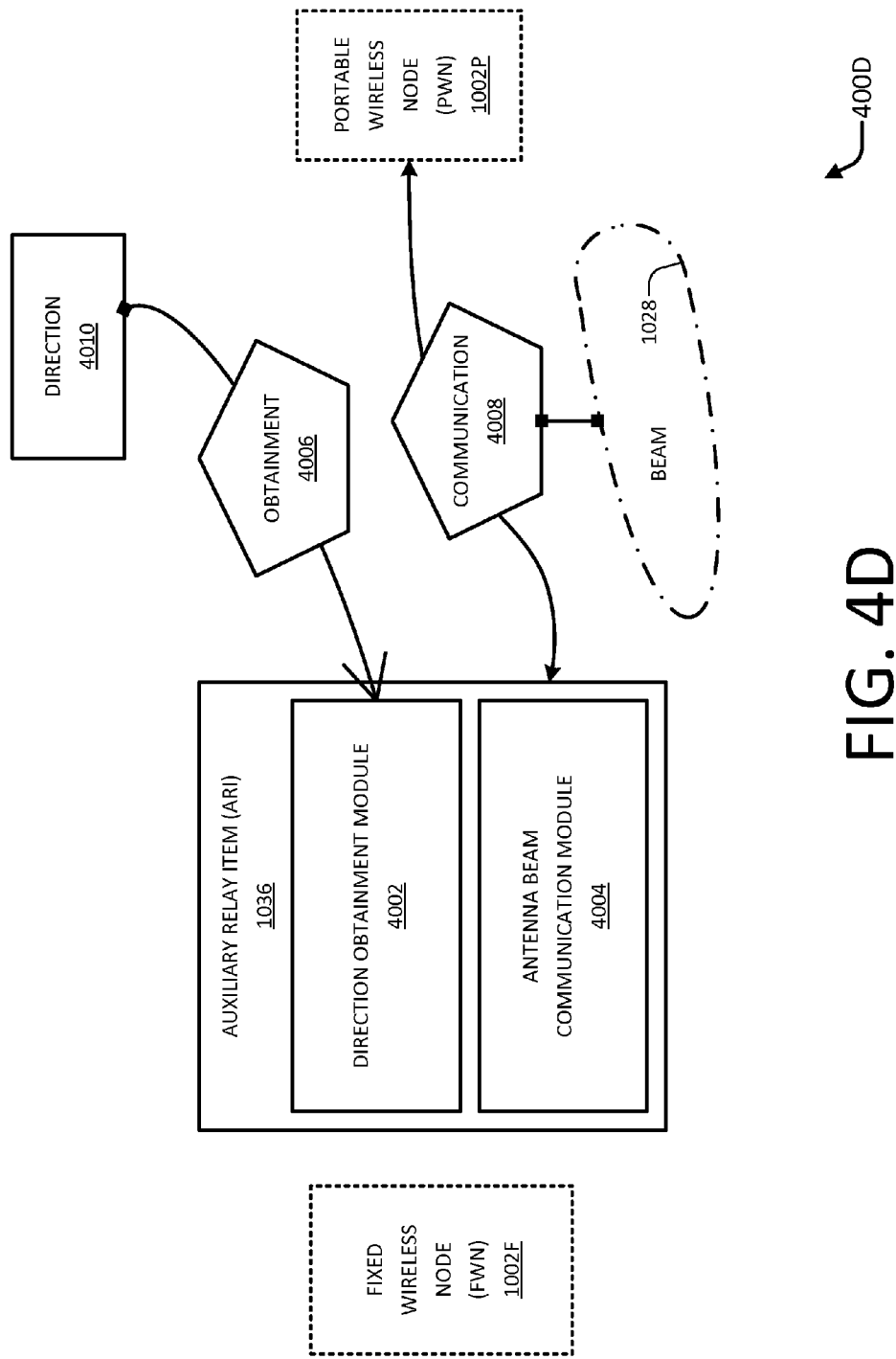
FIG. 4D is another schematic diagram that includes at least one example device, such as an auxiliary relay item or a portable wireless node, that is capable of handling scenarios for portable wireless node auxiliary relay in accordance with certain example embodiments.

FIG. 4D is a schematic diagram 400D that includes at least one example device, such as a portable wireless node or an auxiliary relay item, that is capable of handling scenarios for portable wireless node auxiliary relay in accordance with certain example embodiments. As shown in FIG. 4D, by way of example but not limitation, schematic diagram 400D depicts at least one device that may include or comprise at least one auxiliary relay item (ARI) 1036. More specifically, schematic diagram 400D depicts at least one device that may include at least one direction obtainment module 4002 or at least one antenna beam communication module 4004. Additionally or alternatively, schematic diagram 400D may include, by way of example but not limitation, at least one obtainment 4006, at least one communication 4008, at least one portable wireless node (PWN) 1002P, at least one direction 4010, at least one beam 1028, or at least one fixed wireless node (FWN) 1002F. By way of example but not limitation, a direction obtainment module 4002 or an antenna beam communication module 4004 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. Additionally or alternatively, a portable wireless node 1002P may include a direction obtainment module 4002 or an antenna beam communication module 4004 and may perform an obtainment 4006 or a communication 4008 (A portable wireless node 1002P may perform any one or more of operations depicted in at least FIGS. 6E-6G.). However, claimed subject matter is not limited to any particular described embodiments, implementations, examples, etc.

For certain example embodiments, a direction obtainment module 4002 or an antenna beam communication module 4004 may be implemented separately or at least partially jointly or in combination with or by at least one auxiliary relay item (ARI) 1036. For certain example implementations, a direction obtainment module 4002 may be configured to obtain (e.g., via at least one obtainment 4006) at least one direction 4010 for establishing at least one beam 1028 toward at least one portable wireless node (PWN) 1002P. For certain example implementations, an antenna beam communication module 4004 may be configured to communicate (e.g., via at least one communication 4008) with at least one portable wireless node 1002P using at least one beam 1028 in accordance with at least one direction 4010.

Figure 4E:
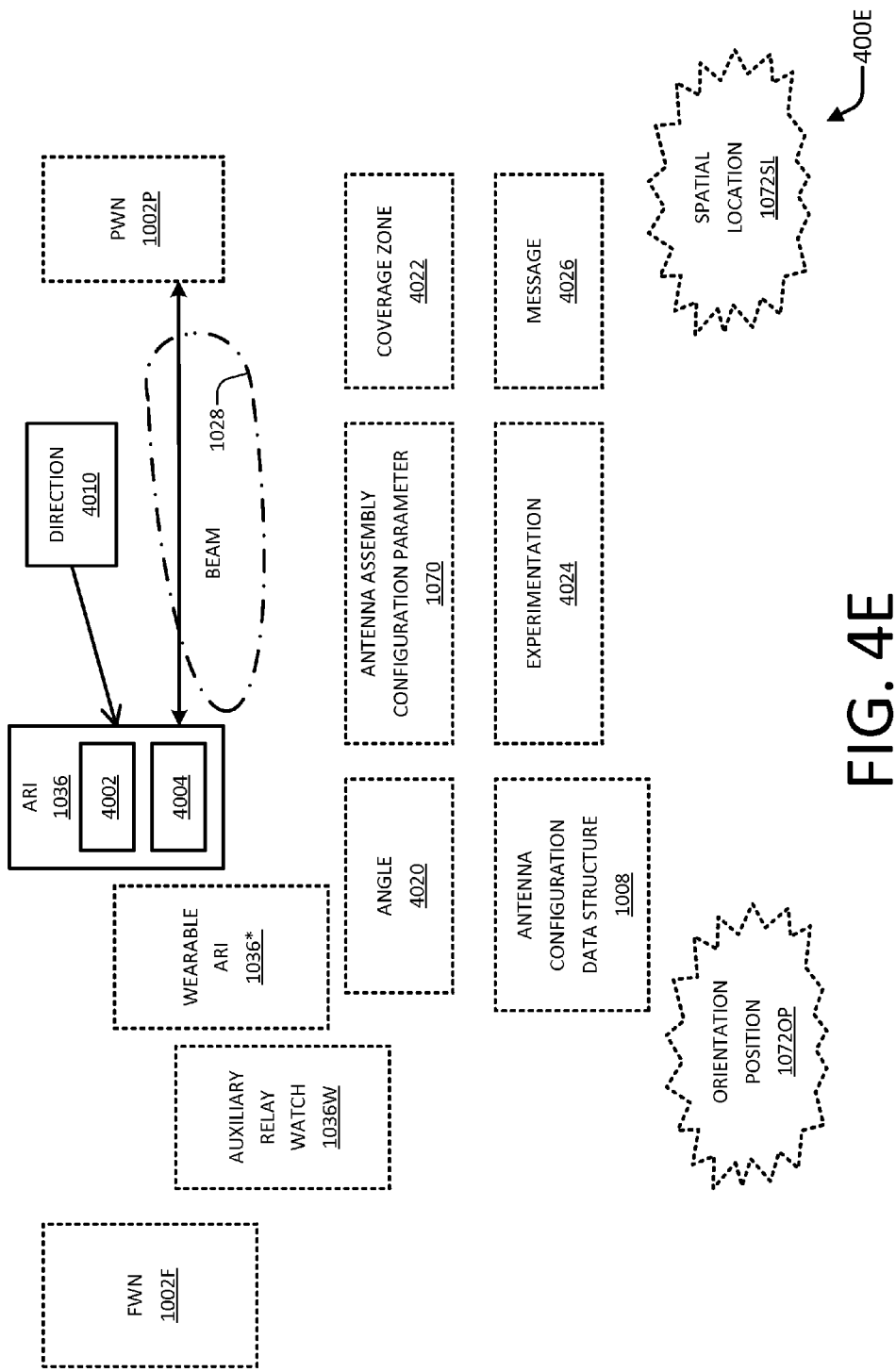
FIGS. 4E-4F are other schematic diagrams that include at least one example device and that depict example scenarios for portable wireless node auxiliary relay in accordance with certain example embodiments.
Figure 4F:
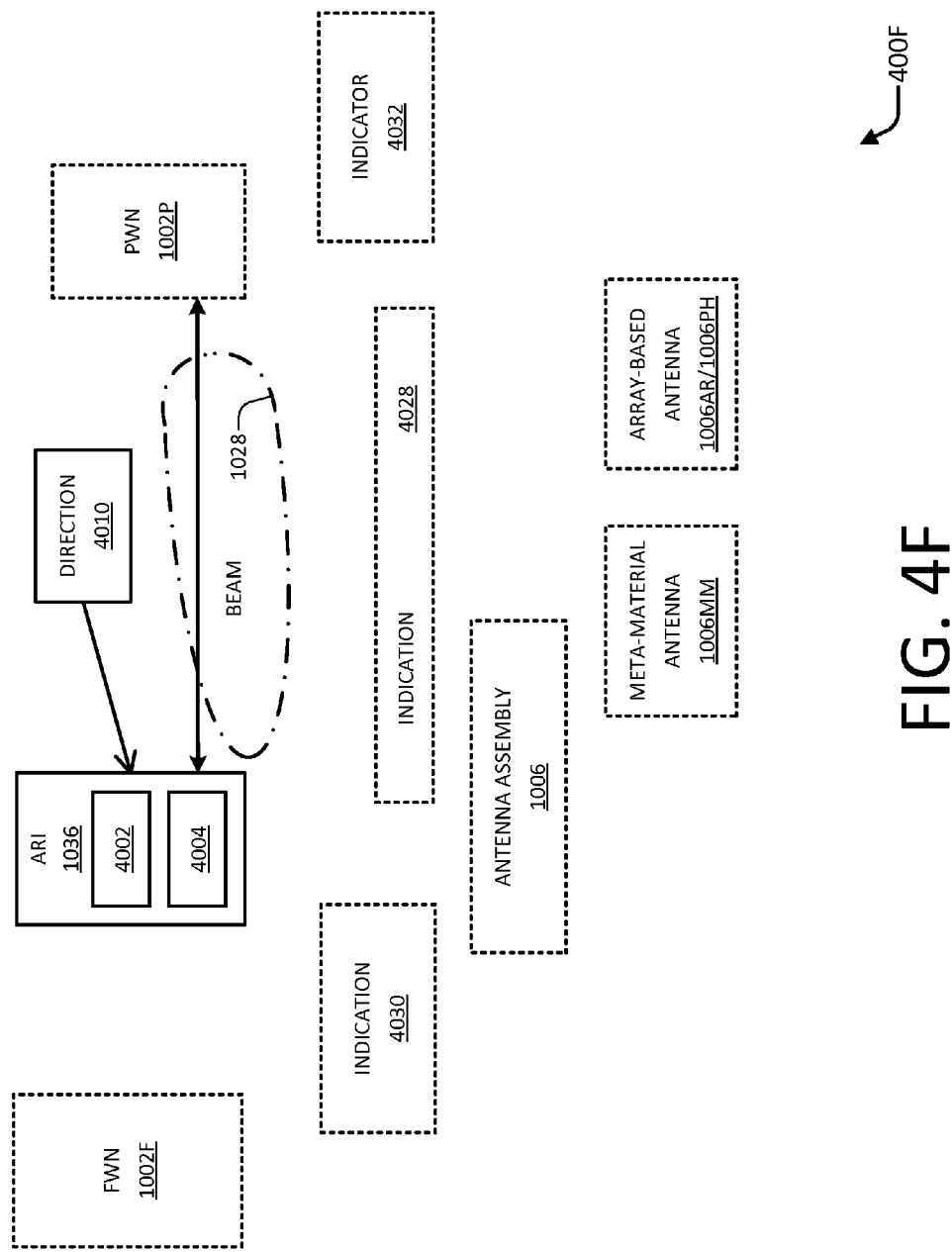

FIGS. 4E-4F are schematic diagrams 400E-400F that include at least one example device and that depict example scenarios for portable wireless node auxiliary relay in accordance with certain example embodiments. As shown in FIGS. 4E-4F, by way of example but not limitation, one or more of schematic diagrams 400E-400F may include at least one auxiliary relay item (ARI) 1036, at least one direction obtainment module 4002, at least one antenna beam communication module 4004, at least one direction 4010, at least one beam 1028, at least one portable wireless node (PWN) 1002P, or at least one fixed wireless node (FWN) 1002F. Each of schematic diagrams 400E-400F may include alternative or additional depictions, which may relate to portable wireless node auxiliary relay, as described herein. In addition to or in alternative to description herein below with specific reference to FIGS. 4E-4F, illustrated aspects of schematic diagrams 400E-400F may be relevant to example description with reference to any one or more of FIG. 5 or 6A-6G. However, claimed subject matter is not limited to any particular described embodiments, implementations, examples, etc.

As shown in FIG. 4E, by way of example but not limitation, schematic diagram 400E may further include at least one wearable auxiliary relay item (ARI) 1036*, at least one auxiliary relay watch 1036W, at least one angle 4020, at least one coverage zone 4022, at least one antenna assembly configuration parameter 1070, at least one antenna configuration data structure 1008, at least some experimentation 4024, at least one message 4026, at least one orientation position 1072OP, or at least one spatial location 1072SL. Additional or alternative description that may be relevant to schematic diagram 400E is provided herein below with particular reference to one or more of any of FIGS. 6A-6G.

As shown in FIG. 4F, by way of example but not limitation, schematic diagram 400F may further include at least one indication 4028, at least one antenna assembly 1006, at least one indication 4030, at least one meta-material antenna 1006MM, at least one array-based antenna 1006AR/1006PH, or at least one indicator 4032. Additional or alternative description that may be relevant to schematic diagram 400F is provided herein below with particular reference to one or more of any of FIGS. 6A-6G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
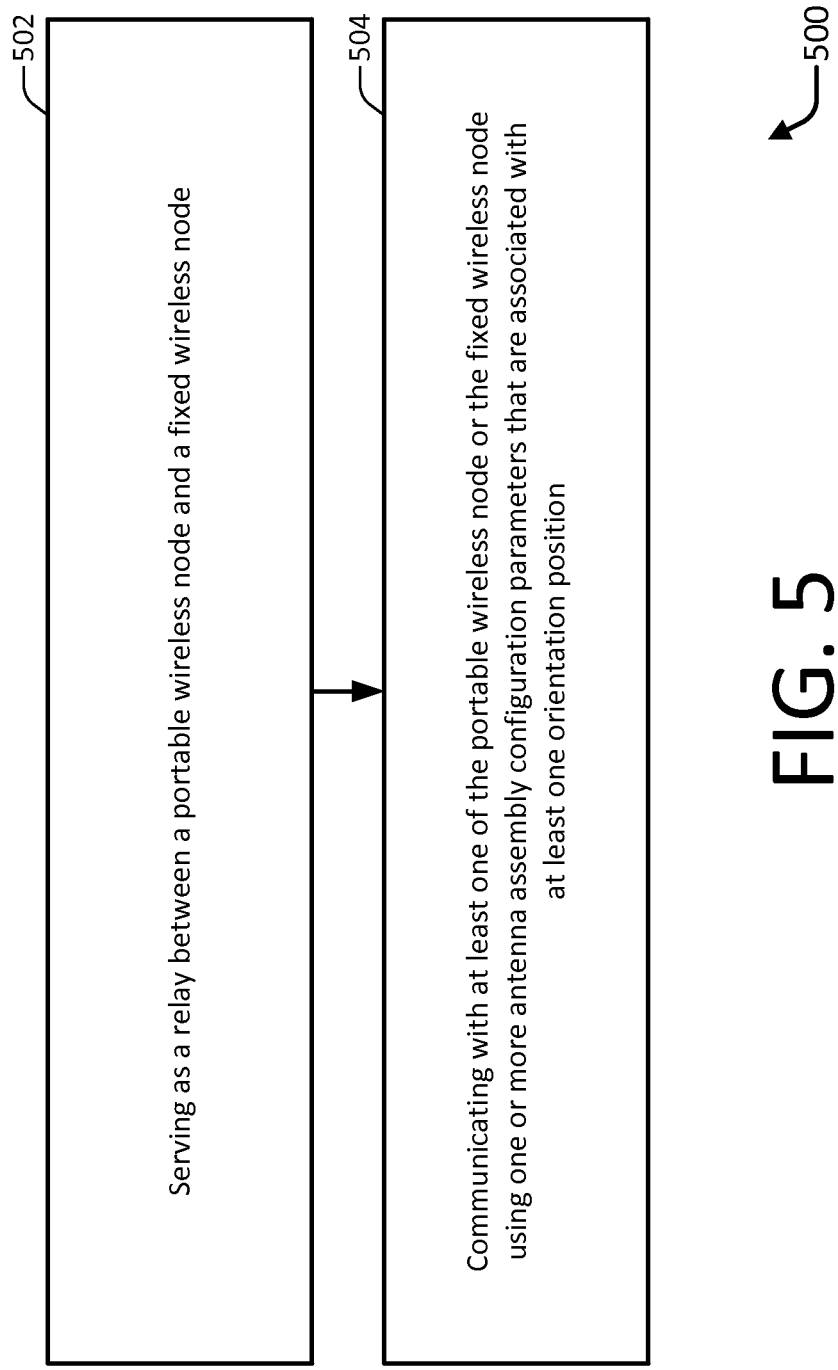
FIG. 5 is a flow diagram illustrating an example method for at least one device with regard to portable wireless node auxiliary relay in accordance with certain example embodiments.

FIG. 5 is a flow diagram 500 illustrating an example method for at least one device with regard to portable wireless node auxiliary relay in accordance with certain example embodiments. As illustrated, flow diagram 500 may include any of operations 502-504. Although operations 502-504 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 500 may be performed so as to be fully or partially overlapping with other operation(s). For certain example embodiments, one or more operations of flow diagram 500 may be performed by at least one device, such as an auxiliary relay item 1036 or at least a portion thereof, such as one or more modules thereof. However, claimed subject matter is not limited to any particular described embodiments, implementations, examples, etc.

For certain example embodiments, a method for portable wireless node auxiliary relay (e.g., that may include, involve, address, react to, pertain to, or a combination thereof, etc. or other otherwise relate to frequency accommodation), which method may be at least partially implemented using hardware (e.g., circuitry, at least one processor, processor-accessible memory, at least one module, or a combination thereof, etc.) of a device such as an auxiliary relay item, may include an operation 502 or an operation 504. An operation 502 may be directed at least partially to serving as a relay between a portable wireless node and a fixed wireless node. For certain example implementations, at least one device (e.g., an auxiliary relay item (ARI) 1036, such as a smart watch) may serve as (e.g., act as, provide benefit(s) of, function as, operate in accordance with, perform as, or a combination thereof, etc. via at least one relay implementation 4106) a relay 4110 (e.g., a forwarder, an intermediary, a device or entity or unit that receives from a source and transmits to a destination, a repeater, a go-between, an inter-agent, an electronic mediator, or a combination thereof, etc.) between a portable wireless node 1002P (e.g., a mobile device, a mobile phone, a tablet, a slate computer, a phablet, a portable gaming device, a smartphone, a notebook computer, a mobile repeater, a user equipment (UE), a mobile station (MS), a laptop computer, a hand-held radio, a wireless component for a vehicle, a walker-talkie, a roving transceiver, a wireless device that moves under its own power or control (e.g., an autonomous motorized robot or an unmanned aerial vehicle (UAV)), a wireless device that moves under the power or control of another entity (e.g., a vehicle or a remotely-piloted craft that is controlled by either a passenger or a remote human or by a remote machine), or a combination thereof, etc.) and a fixed wireless node 1002F (e.g., an access point (AP), a base station (BS), or a combination thereof, etc.).

For certain example embodiments, an operation 504 may be directed at least partially to communicating with at least one of the portable wireless node or the fixed wireless node using one or more antenna assembly configuration parameters that are associated with at least one orientation position. For certain example implementations, at least one device (e.g., an auxiliary relay item (ARI) 1036, such as intelligent glasses) may communicate (e.g., impart, transmit, receive, exchange, broadcast, accept delivery, send, or a combination, thereof, etc. via at least one communication 4108 information, data, knowledge, bits, or a combination thereof, etc.) with at least one of a portable wireless node 1002P (e.g., a smart phone) or a fixed wireless node 1002F (e.g., an access point) using (e.g., employing, relying at least partially on, engaging, processing electromagnetic signals based at least partially on, transceiving with an antenna assembly set up with, or a combination thereof, etc.) one or more antenna assembly configuration parameters 1070 (e.g., at least one variable impacting functionality of an antenna assembly or electromagnetic radiation emanated therefrom or collected thereby, at least one mechanism affecting antenna assembly performance, at least one value applied to an antenna assembly control or data input, at least one boundary or guideline for how electromagnetic fields interact with an adjustable antenna assembly, at least one manipulation of signals being forwarded to or accepted from an antenna assembly, one or more phase delays, one or more meta-material antenna control signal values, one or more phased-array antenna operational inputs, one or more antenna element or junction selection indicators, or a combination thereof, etc.) that are associated with (e.g., that correspond to, that are linked to, that relate to, that pertain to, that are matched with, that are mated to, that are derived from, or a combination thereof, etc.) at least one orientation position 1072OP (e.g., a direction that is being faced toward or pointed to, a ray in space, an Euler value, a roll or pitch or yaw value, a rotational position, an angle of inclination or declination, a vector or normal described—such as defined—relative to a face or edge of a device, or a combination thereof, etc.).

FIGS. 6A-6G depict example additions or alternatives for a flow diagram of FIG. 5 in accordance with certain example embodiments. As illustrated, flow diagrams of FIGS. 6A-6G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently or along with one or more other operations—such as operation 6000A or 6000B being performed separately from operation 502 or 504). Also, at least some operation(s) of flow diagrams of FIGS. 6A-6G may be performed so as to be fully or partially overlapping with other operation(s). Moreover, one or more of flow diagrams of FIGS. 6A-6G may illustrate implementation of one or more additional operations as represented by an operation 506 (if depicted). One or more additional operations of an operation 506 may alternatively be performed independently. For certain example embodiments, one or more operations of flow diagrams 600A-600G (of FIGS. 6A-6G) may be performed by at least one device (e.g., by an auxiliary relay item 1036 or at least a portion thereof, such as one or more modules thereof—or in an alternative, by a portable wireless node 1002P or at least a portion thereof, such as one or more modules thereof). However, claimed subject matter is not limited to any particular described embodiments, implementations, examples, etc.

Figure 6A:
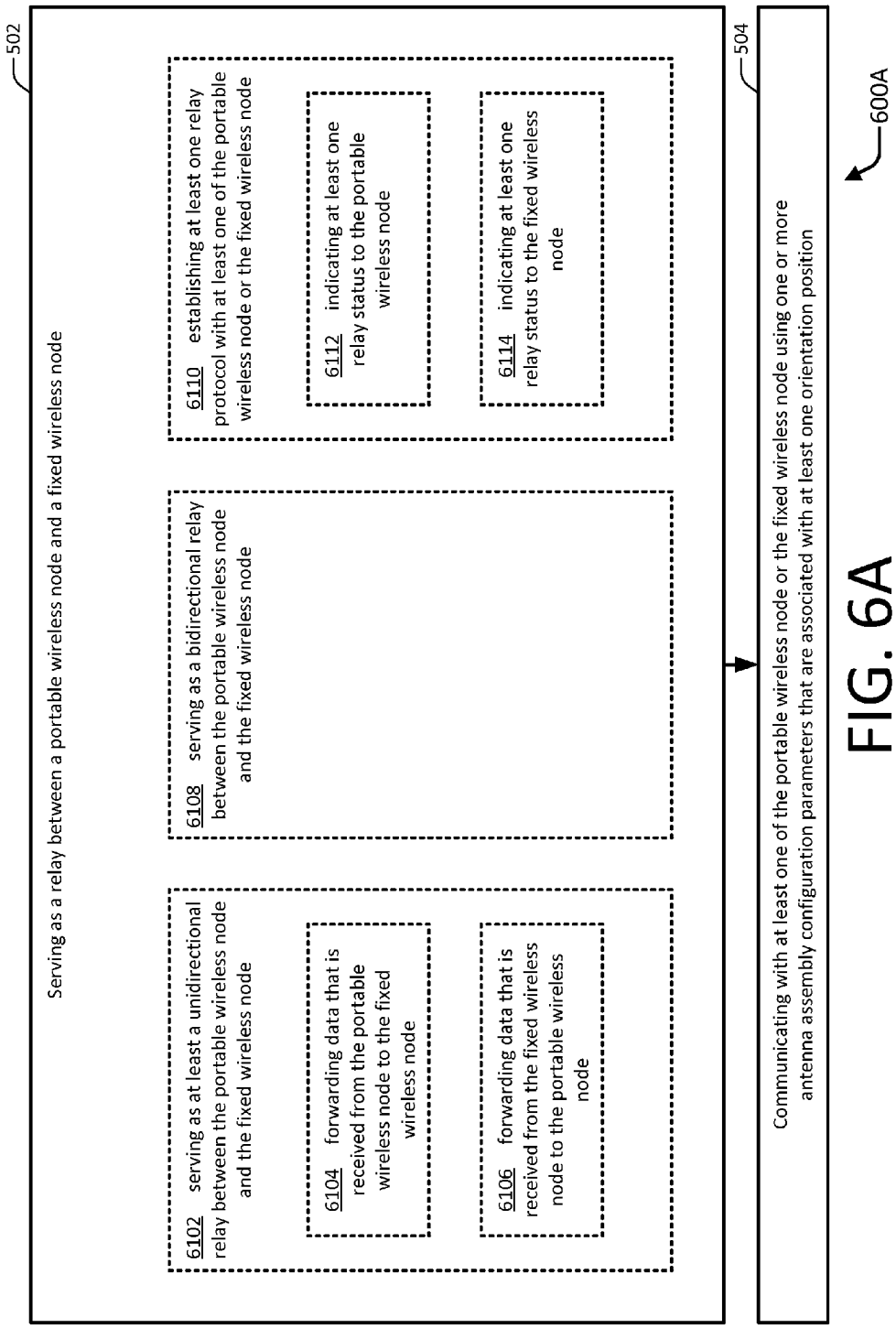
FIGS. 6A-6D depict example additions or alternatives for a flow diagram of FIG. 5 in accordance with certain example embodiments.

FIG. 6A illustrates a flow diagram 600A having any one or more of example operations 6102-6114. For example, an operation 502 may include an operation 6102 of serving as at least a unidirectional relay between the portable wireless node and the fixed wireless node. For instance, at least one auxiliary relay item (e.g., an auxiliary relay item 1036, such as a smart watch) may serve as (e.g., function as) at least a unidirectional relay 4110U (e.g., one-way forwarding, upstream reception from PWN and transmission to FWN, downstream reception from FWN and transmission to PWN, handshaking in two directions but media streaming from the internet to a device, or a combination thereof, etc.) between a portable wireless node 1002P (e.g., a tablet computer) and a fixed wireless node 1002F (e.g., a Wi-Fi access point).

For example, an operation 6102 may include an operation 6104 of forwarding data that is received from the portable wireless node to the fixed wireless node. For instance, at least one auxiliary relay item (e.g., an auxiliary relay item 1036, such as smart glasses) may forward (e.g., send onward during or after receipt, receive from a source and transmit to a destination, accept from one device and provide to another, propagate to a next stage or hop, pass ahead, or a combination thereof, etc.) data 4120 (e.g., bits, values that may be interpreted as information, communication payload, at least a portion of a document or a video or a web page or picture, or a combination thereof, etc.) that is received (e.g., acquired from an over-the-air signal, demodulated, decoded as an electromagnetic stimulation of an antenna, accepted, frequency down-converted, routed from an antenna or antenna element, or a combination thereof, etc.) from a portable wireless node 1002P (e.g., laptop) to a fixed wireless node 1002F (e.g., a wireless router).

For example, an operation 6102 may include an operation 6106 of forwarding data that is received from the fixed wireless node to the portable wireless node. For instance, at least one auxiliary relay item (e.g., an auxiliary relay item 1036, such as an intelligent smart phone holster or a smart case for a tablet computer) may forward (e.g., send onward during or after receipt, receive from a source and transmit to a destination, accept from one device and provide to another, propagate to a next stage or hop, pass ahead, or a combination thereof, etc.) data 4120 (e.g., bits, values that may be interpreted as information, communication payload, at least a portion of a document or a video or a web page or picture, or a combination thereof, etc.) that is received (e.g., acquired from an over-the-air signal, demodulated, decoded as an electromagnetic stimulation of an antenna, accepted, frequency down-converted, routed from an antenna or antenna element, or a combination thereof, etc.) from a fixed wireless node 1002F (e.g., a base station) to a portable wireless node 1002P (e.g., a convertible laptop-tablet computer).

For example, an operation 502 may include an operation 6108 of serving as a bidirectional relay between the portable wireless node and the fixed wireless node. For instance, at least one auxiliary relay item (e.g., an auxiliary relay item 1036, such as an intelligent hat with transceiving capabilities) may serve as (e.g., operate in accordance with) a bidirectional relay 4110B (e.g., two-way forwarding, accepting data from and sending data to a device and respectively transmitting data to and receiving data from another device, upstream reception from PWN and transmission to FWN as well as downstream reception from FWN and transmission to PWN, facilitating uploading and downloading of files as an intermediary, or a combination thereof, etc.) between a portable wireless node 1002P (e.g., a phablet) and a fixed wireless node 1002F (e.g., an LTE advanced base station).

For example, an operation 502 may include an operation 6110 of establishing at least one relay protocol with at least one of the portable wireless node or the fixed wireless node. For instance, at least one auxiliary relay item (e.g., an auxiliary relay item 1036, such as an intelligent anklet) may establish (e.g., negotiate, engage in, produce, bring about, instantiate, effect, activate, settle on, agree to, or a combination thereof, etc.) at least one relay protocol 4122 (e.g., a set of rules to implement a relay, one or more procedures followed to forward data from one device to another device, a wireless standard, a negotiated encryption, a timing or timeslot, a frequency, a data encapsulation procedure, one or more tunneling parameters, an indication if bank shots— such as bounced signals—are supported (e.g., reflections off of a wall, a bridge, a building, or a combination thereof, etc.), a virtual private network (VPN) connection, or a combination thereof, etc.) with at least one of a portable wireless node 1002P (e.g., a smart phone) or a fixed wireless node 1002F (e.g., a Gigabit Wi-Fi access point).

For example, an operation 6110 may include an operation 6112 of indicating at least one relay status to the portable wireless node. For instance, at least one auxiliary relay item (e.g., an auxiliary relay item 1036, such as smart glasses) may indicate (e.g., send a message informing, signal, evidence, connote, notify, supply, or a combination thereof, etc.) at least one relay status 4124 (e.g., active, inactive, credential from a fixed wireless node, ready, acknowledged, data received or not received from a fixed wireless node, ready to transmit or forward, or a combination thereof, etc.) to a portable wireless node 1002P (e.g., an Apple iPhone).

For example, an operation 6110 may include an operation 6114 of indicating at least one relay status to the fixed wireless node. For instance, at least one auxiliary relay item (e.g., an auxiliary relay item 1036, such as a ground or aerial roving robot) may indicate (e.g., send a message informing, signal, evidence, connote, notify, supply, or a combination thereof, etc.) at least one relay status 4124 (e.g., active, inactive, credential from a portable wireless node, ready, acknowledged, data received or not received from a portable wireless node, ready to transmit or forward, or a combination thereof, etc.) to a fixed wireless node 1002F (e.g., a base transceiver station).

Figure 6B:
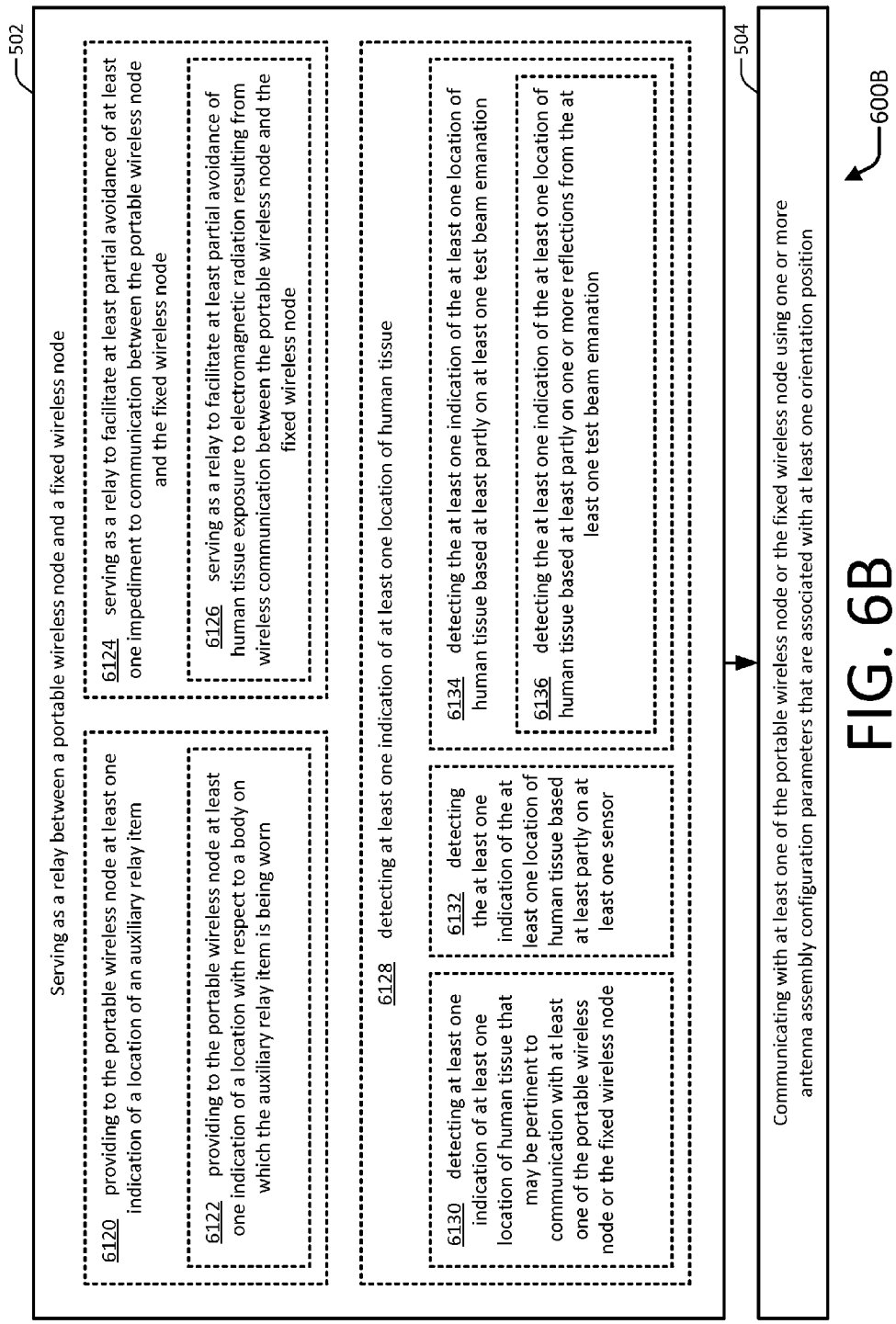

FIG. 6B illustrates a flow diagram 600B having any one or more of example operations 6120-6136. For example, an operation 502 may include an operation 6120 of providing to the portable wireless node at least one indication of a location of an auxiliary relay item. For instance, at least one auxiliary relay item (e.g., an auxiliary relay item 1036, such as a mobile repeater) may provide (e.g., send, transmit, furnish, supply, signal, or a combination thereof, etc.) to a portable wireless node 1002P (e.g., an unmanned aerial vehicle (UAV)) at least one indication 4126 (e.g., a description, a designation, an expression, a representation, an indirect identification, a direct identification, a reference, a code providing a linkage to, a signal, a value, or a combination thereof, etc.) of a location 4128 (e.g., at least one satellite positioning system (SPS) coordinate, such as one or more GPS coordinates; a height, a distance or direction relative to a location of a portable wireless node; a body part; a room or portion thereof; or a combination thereof; etc.) of an auxiliary relay item 1036 (e.g., a mobile repeater).

For example, an operation 6120 may include an operation 6122 of providing to the portable wireless node at least one indication of a location with respect to a body on which the auxiliary relay item is being worn. For instance, at least one auxiliary relay item (e.g., an auxiliary relay item 1036, such as a smart watch) may provide (e.g., send, transmit, furnish, supply, signal, or a combination thereof, etc.) to a portable wireless node 1002P (e.g., a mobile phone) at least one indication 4126 (e.g., a description, a designation, an expression, a representation, an indirect identification, a direct identification, a reference, a code providing a linkage to, a signal, a value, or a combination thereof, etc.) of a location 4128 (e.g., wrist, distance or direction from head or other specified body part, ankle, waist, top of head, or a combination thereof, etc.) with respect to (e.g., with reference to, with regard to, in at least partial dependence on, derived at least partly based on, or a combination thereof, etc.) a body 4130 (e.g., a human physique or portion thereof) on which an auxiliary relay item 1036 (e.g., a smart watch) is being worn (e.g., being carried on or associated with a person using self-supporting or self-clinging apparatus, such as clothing or a shoe or a bag or jewelry or glasses; being attached to clothing, a shoe, or a bag—such as a messenger bag; an item that adheres or cleaves to a person; or a combination thereof; etc.).

For example, an operation 502 may include an operation 6124 of serving as a relay to facilitate at least partial avoidance of at least one impediment to communication between the portable wireless node and the fixed wireless node. For instance, at least one auxiliary relay item (e.g., an auxiliary relay item 1036, such as a smart shoe) may serve as (e.g., perform as) a relay 4110 (e.g., a go-between device) to facilitate (e.g., aid, assist, further, expedite, make easier, or a combination thereof, etc.) at least partial avoidance (e.g., keeping clear, prevention, reduction, skirting, stop or reduce impact from occurrence, or a combination thereof, etc.) of at least one impediment 4132 (e.g., an obstacle, an object, electromagnetic interference, a vehicle, a wall, an attenuating material, or a combination thereof, etc.) to communication (e.g., transmission, reception, exchange, broadcasting, delivery of data, or a combination thereof, etc.) between a portable wireless node 1002P (e.g., a Galaxy Tab tablet computer) and a fixed wireless node 1002F (e.g., a cellular micro base station).

For example, an operation 6124 may include an operation 6126 of serving as a relay to facilitate at least partial avoidance of human tissue exposure to electromagnetic radiation resulting from wireless communication between the portable wireless node and the fixed wireless node. For instance, at least one auxiliary relay item (e.g., an auxiliary relay item 1036, such as a wearable computer) may serve as (e.g., operate in accordance with) a relay 4110 (e.g., an electronic forwarder) to facilitate (e.g., aid, assist, further, expedite, make easier, or a combination thereof, etc.) at least partial avoidance (e.g., keeping clear, prevention, reduction, skirting, stop or reduce impact from occurrence, or a combination thereof, etc.) of human tissue 4134 (e.g., flesh, bone, skin, head, brain, organ, or a combination thereof, etc.) exposure to (e.g., placing within a wave of, subjecting to a certain intensity of, putting in a dangerous level of, cause to be in harm's way, or a combination thereof, etc.) electromagnetic radiation (e.g., electromagnetic signal, radio frequency (RF) signal, omnidirectional electromagnetic waves, directed RF beam, or a combination thereof, etc.) resulting from wireless communication (e.g., transmission, reception, exchange, broadcasting, delivery of data, or a combination thereof, etc.) between a portable wireless node 1002P (e.g., a gaming device) and a fixed wireless node 1002F (e.g., a wireless local area network router).

For example, an operation 502 may include an operation 6128 of detecting at least one indication of at least one location of human tissue. For instance, at least one auxiliary relay item (e.g., an auxiliary relay item 1036, such as smart glasses) may detect (e.g., discover, ascertain existence of, observe, acquire via a sensor, receive, or a combination thereof, etc.) at least one indication 4126 (e.g., a description, a designation, an expression, a representation, an indirect identification, a direct identification, a signal, a value, a sensor reading, a result of an analysis, or a combination thereof, etc.) of at least one location 4128 (e.g., wrist, waist, top of head, left, right, upward, to a backside of a device, on an edge of a device, hand versus head, or a combination thereof, etc.) of human tissue 4134 (e.g., flesh, bone, skin, head, brain, organ, or a combination thereof, etc.).

For example, an operation 6128 may include an operation 6130 of detecting at least one indication of at least one location of human tissue that may be pertinent to communication with at least one of the portable wireless node or the fixed wireless node. For instance, at least one auxiliary relay item (e.g., an auxiliary relay item 1036, such as an intelligent anklet) may detect (e.g., discover, ascertain existence of, observe, acquire via a sensor, receive, or a combination thereof, etc.) at least one indication 4126 (e.g., a description, a designation, an expression, a representation, an indirect identification, a direct identification, a signal, a value, a sensor reading, a result of an analysis, or a combination thereof, etc.) of at least one location 4128 (e.g., wrist, waist, top of head, left, right, upward, to a backside of a device, on an edge of a device, hand versus head, or a combination thereof, etc.) of human tissue 4134 (e.g., flesh, bone, skin, head, brain, organ, or a combination thereof, etc.) that may be pertinent to (e.g., relevant to, impacting, affected by, interfering with, at least partially blocking, potentially damaged by, or a combination thereof, etc.) communication (e.g., transmission, reception, exchange, broadcasting, delivery of data, or a combination thereof, etc.) with at least one of a portable wireless node 1002P (e.g., an LG smart phone) or a fixed wireless node 1002F (e.g., a base station for a "small cell", such as a femtocell, a picocell, or a microcell).

For example, an operation 6128 may include an operation 6132 of detecting the at least one indication of the at least one location of human tissue based at least partly on at least one sensor. For instance, at least one auxiliary relay item (e.g., an auxiliary relay item 1036, such as an intelligent hat) may detect (e.g., discover, ascertain existence of, observe, acquire via a sensor, receive, or a combination thereof, etc.) at least one indication 4126 (e.g., a description, a designation, an expression, a representation, an indirect identification, a direct identification, a signal, a value, a sensor reading, a result of an analysis, or a combination thereof, etc.) of at least one location 4128 (e.g., wrist, waist, top of head, left, right, upward, to a backside of a device, on an edge of a device, hand versus head, or a combination thereof, etc.) of human tissue 4134 (e.g., flesh, bone, skin, head, brain, organ, or a combination thereof, etc.) based at least partly on at least one sensor 4136 (e.g., capacitive sensor, proximity sensor, pressure sensor, gravitational sensor, accelerometer, sound sensor, or a combination thereof, etc.).

For example, an operation 6128 may include an operation 6134 of detecting the at least one indication of the at least one location of human tissue based at least partly on at least one test beam emanation. For instance, at least one auxiliary relay item (e.g., an auxiliary relay item 1036, such as a smart watch) may detect (e.g., discover, ascertain existence of, observe, acquire via a sensor, receive, or a combination thereof, etc.) at least one indication 4126 (e.g., a description, a designation, an expression, a representation, an indirect identification, a direct identification, a signal, a value, a sensor reading, a result of an analysis, or a combination thereof, etc.) of at least one location 4128 (e.g., wrist, waist, top of head, left, right, upward, to a backside of a device, on an edge of a device, hand versus head, or a combination thereof, etc.) of human tissue 4134 (e.g., flesh, bone, skin, head, brain, organ, or a combination thereof, etc.) based at least partly on at least one test beam emanation 4138 (e.g., electromagnetic emission, radio frequency transmission, directed antenna beam, focused signal application, or a combination thereof, etc.).

For example, an operation 6134 may include an operation 6136 of detecting the at least one indication of the at least one location of human tissue based at least partly on one or more reflections from the at least one test beam emanation. For instance, at least one auxiliary relay item (e.g., an auxiliary relay item 1036, such as smart glasses) may detect (e.g., discover, ascertain existence of, observe, acquire via a sensor, receive, or a combination thereof, etc.) at least one indication 4126 (e.g., a description, a designation, an expression, a representation, an indirect identification, a direct identification, a signal, a value, a sensor reading, a result of an analysis, or a combination thereof, etc.) of at least one location 4128 (e.g., wrist, waist, top of head, left, right, upward, to a backside of a device, on an edge of a device, hand versus head, or a combination thereof, etc.) of human tissue 4134 (e.g., flesh, bone, skin, head, brain, organ, or a combination thereof, etc.) based at least partly on one or more reflections 4140 (e.g., returning electromagnetic wave; bounced signal; radio frequency radiation that is sent out, makes an incident on an obstacle, and at least partially comes back to a place or device of origin from the obstacle; rebounding signal image; transmission echo; or a combination thereof; etc.) from at least one test beam emanation 4138 (e.g., electromagnetic emission, radio frequency transmission, directed antenna beam, focused signal application, or a combination thereof, etc.).

Figure 6C:
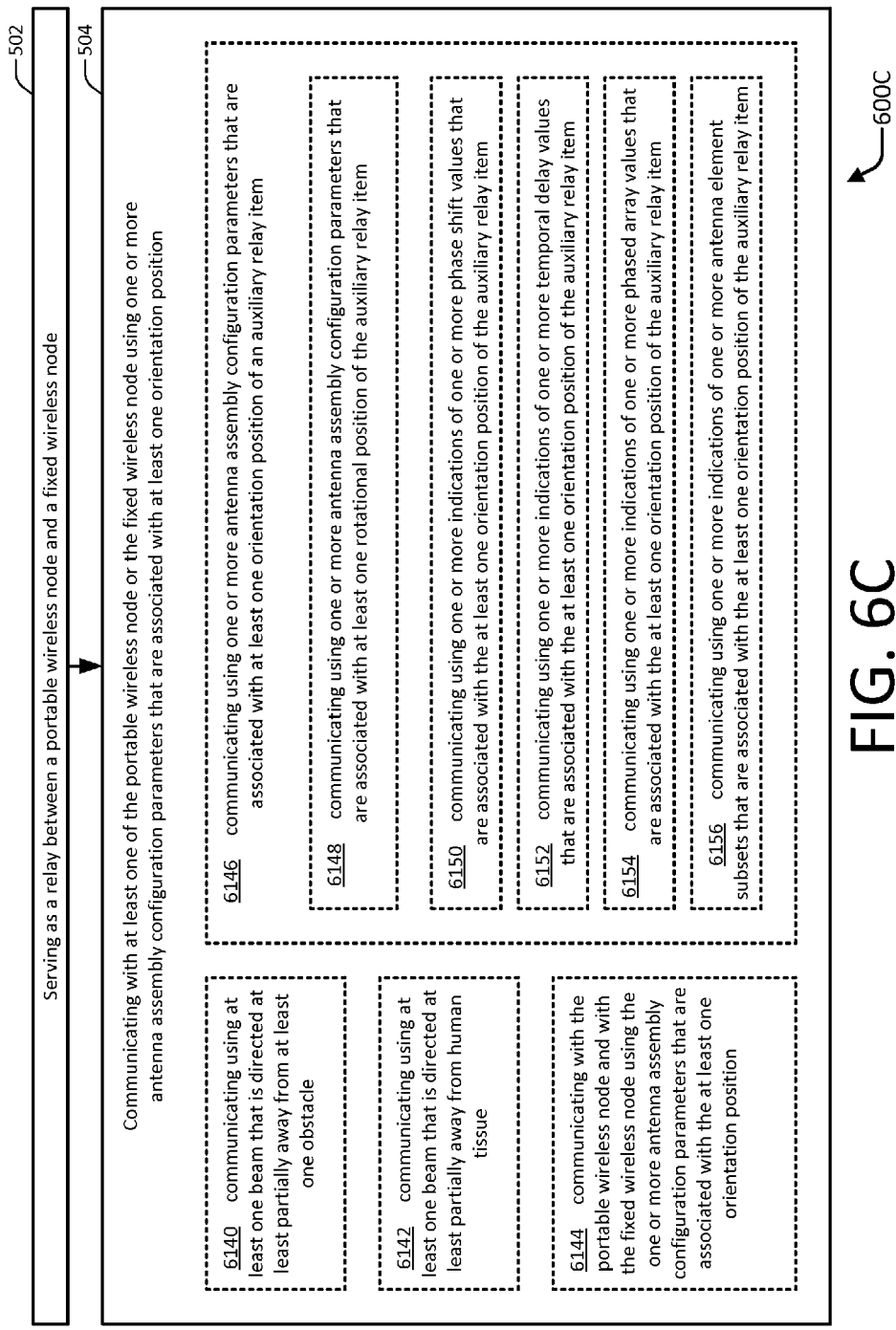

FIG. 6C illustrates a flow diagram 600C having any one or more of example operations 6140-6156. For example, an operation 504 may include an operation 6140 of communicating using at least one beam that is directed at least partially away from at least one obstacle. For instance, at least one auxiliary relay item (e.g., an auxiliary relay item 1036, such as a smart watch) may communicate (e.g., impart data) using (e.g., employing) at least one beam 1028 (e.g., focused electromagnetic communication, directed emanation or reception, antenna beam pattern, coverage area for RF signaling, non-omnidirectional wireless communication, or a combination thereof, etc.) that is directed (e.g., pointed, emanated, aimed, or a combination thereof, etc.) at least partially away from at least one obstacle 4150 (e.g., object, a material that causes interference, something that may at least partially block signal propagation, barrier, impediment, wall, column, building, flesh, lampshade, vehicle, or a combination thereof, etc.).

For example, an operation 504 may include an operation 6142 of communicating using at least one beam that is directed at least partially away from human tissue. For instance, at least one auxiliary relay item (e.g., an auxiliary relay item 1036, such as an intelligent hat) may communicate (e.g., receive data) using (e.g., by engaging in) at least one beam 1028 (e.g., focused electromagnetic communication, directed emanation or reception, antenna beam pattern, coverage area for RF signaling, non-omnidirectional wireless communication, or a combination thereof, etc.) that is directed (e.g., pointed, emanated, aimed, or a combination thereof, etc.) at least partially away from human tissue 4134 (e.g., flesh, bone, skin, head, brain, organ, or a combination thereof, etc.).

For example, an operation 504 may include an operation 6144 of communicating with the portable wireless node and with the fixed wireless node using the one or more antenna assembly configuration parameters that are associated with the at least one orientation position. For instance, at least one auxiliary relay item (e.g., an auxiliary relay item 1036, such as a smart watch) may communicate (e.g., broadcast data) with a portable wireless node 1002P (e.g., a Nokia Lumia phone) and with a fixed wireless node 1002F (e.g., a Linksys wireless router) using (e.g., employing) one or more antenna assembly configuration parameters 1070 (e.g., mechanism or procedure to operate an antenna assembly to achieve directional transceiving—transmitting or receiving) that are associated with at least one orientation position 1072OP (e.g., an Euler value).

For example, an operation 504 may include an operation 6146 of communicating using one or more antenna assembly configuration parameters that are associated with at least one orientation position of an auxiliary relay item. For instance, at least one auxiliary relay item (e.g., an auxiliary relay item 1036, such as smart glasses) may communicate (e.g., transmit chips) using (e.g., processing electromagnetic signals based at least partially on) one or more antenna assembly configuration parameters 1070 (e.g., at least one variable impacting functionality of an antenna assembly or electromagnetic radiation emanated therefrom or collected thereby) that are associated with (e.g., that correspond to, that are linked to, that relate to, that pertain to, that are matched with, that are mated to, that are derived from, or a combination thereof, etc.) at least one orientation position 1072OP (e.g., a direction that is being faced toward or pointed to) of an auxiliary relay item 1036 (e.g., smart glasses).

For example, an operation 6146 may include an operation 6148 of communicating using one or more antenna assembly configuration parameters that are associated with at least one rotational position of the auxiliary relay item. For instance, at least one auxiliary relay item (e.g., an auxiliary relay item 1036, such as a coat housing or enclosing a computing device) may communicate (e.g., accept delivery of packets) using (e.g., relying at least partially on) one or more antenna assembly configuration parameters 1070 (e.g., at least one specified manipulation of signals being forwarded to or accepted from an antenna assembly at or proximate to the antenna assembly) that are associated with (e.g., that correspond to) at least one rotational position (e.g., amount of spatial change about an axis that passes through at least part of a device) of an auxiliary relay item 1036 (e.g., a coat housing or enclosing a computing device).

For example, an operation 6146 may include an operation 6150 of communicating using one or more indications of one or more phase shift values that are associated with the at least one orientation position of the auxiliary relay item. For instance, at least one auxiliary relay item (e.g., an auxiliary relay item 1036, such as an electronic bag or satchel or attachment thereto) may communicate (e.g., exchange signals) using (e.g., employing) one or more indications 4126 (e.g., a description, a designation, an expression, a representation, an indirect identification, a direct identification, a reference, a code providing a linkage to, a signal, a value, or a combination thereof, etc.) of one or more phase shift values 4152 (e.g., a number or numerical range, a setting implementing a phase shift, one or more switches or processing to realize a phase shift, a phase delay value, an identification of how or how much to change a phase or a timing of a signal, a selection or length of a signal phase delay line, or a combination thereof, etc.) that are associated with (e.g., that are linked to) at least one orientation position 1072OP (e.g., at least one numeral representing at least one Euler value) of the auxiliary relay item 1036 (e.g., electronic bag or satchel or attachment thereto).

For example, an operation 6146 may include an operation 6152 of communicating using one or more indications of one or more temporal delay values that are associated with the at least one orientation position of the auxiliary relay item. For instance, at least one auxiliary relay item (e.g., an auxiliary relay item 1036, such as a smart watch) may communicate (e.g., exchange signals) using (e.g., employing) one or more indications 4126 (e.g., a description, a designation, an expression, a representation, an indirect identification, a direct identification, a reference, a code providing a linkage to, a signal, a value, or a combination thereof, etc.) of one or more temporal delay values 4154 (e.g., a number or numerical range, a setting implementing a temporal delay, one or more switches or processing to realize a temporal delay, a time shifting value, an identification of how or how much to change a timing or a phase of a signal, a selection or length of a signal timing delay line, or a combination thereof, etc.) that are associated with (e.g., that relate to) at least one orientation position 1072OP (e.g., roll or pitch or yaw value) of the auxiliary relay item 1036 (e.g., smart watch).

For example, an operation 6146 may include an operation 6154 of communicating using one or more indications of one or more phased array values that are associated with the at least one orientation position of the auxiliary relay item. For instance, at least one auxiliary relay item (e.g., an auxiliary relay item 1036, such as smart glasses) may communicate (e.g., exchange signals) using (e.g., employing) one or more indications 4126 (e.g., a description, a designation, an expression, a representation, an indirect identification, a direct identification, a reference, a code providing a linkage to, a signal, a value, or a combination thereof, etc.) of one or more phased array values 4156 (e.g., a number or numerical range, a setting implementing directionality or beamforming, one or more switches or processing to realize a directed or beamformed signal, an explanation of how or how much to change a direction or a shape of a signal wave or beam, an identification of which antenna patch or antenna patches to employ, a matrix of values to program operation of an array-based antenna, or a combination thereof, etc.) that are associated with (e.g., that pertain to) at least one orientation position 1072OP (e.g., (i) angle of inclination or declination in degrees or radians or (ii) 30 degrees from vertical and 45 degrees from extending North-to-South) of the auxiliary relay item 1036 (e.g., smart glasses).

For example, an operation 6146 may include an operation 6156 of communicating using one or more indications of one or more antenna element subsets that are associated with the at least one orientation position of the auxiliary relay item. For instance, at least one auxiliary relay item (e.g., an auxiliary relay item 1036, such as a smart shoe) may communicate (e.g., exchange signals) using (e.g., employing) one or more indications 4126 (e.g., a description, a designation, an expression, a representation, an indirect identification, a direct identification, a reference, a code providing a linkage to, a signal, a value, or a combination thereof, etc.) of one or more antenna element subsets 4158 (e.g., a listing or group of antenna elements, a listing or group of antenna junctions coupled to antenna elements, a subset of—or less than all of—an available set of antenna elements, a matrix or process coupling less than all available antenna elements to a receive or transmit chain, or a combination thereof, etc.) that are associated with (e.g., that are matched with) at least one orientation position 1072OP (e.g., vector or normal described—such as defined—relative to a face or edge of a device) of the auxiliary relay item 1036 (e.g., smart shoe).

Figure 6D:
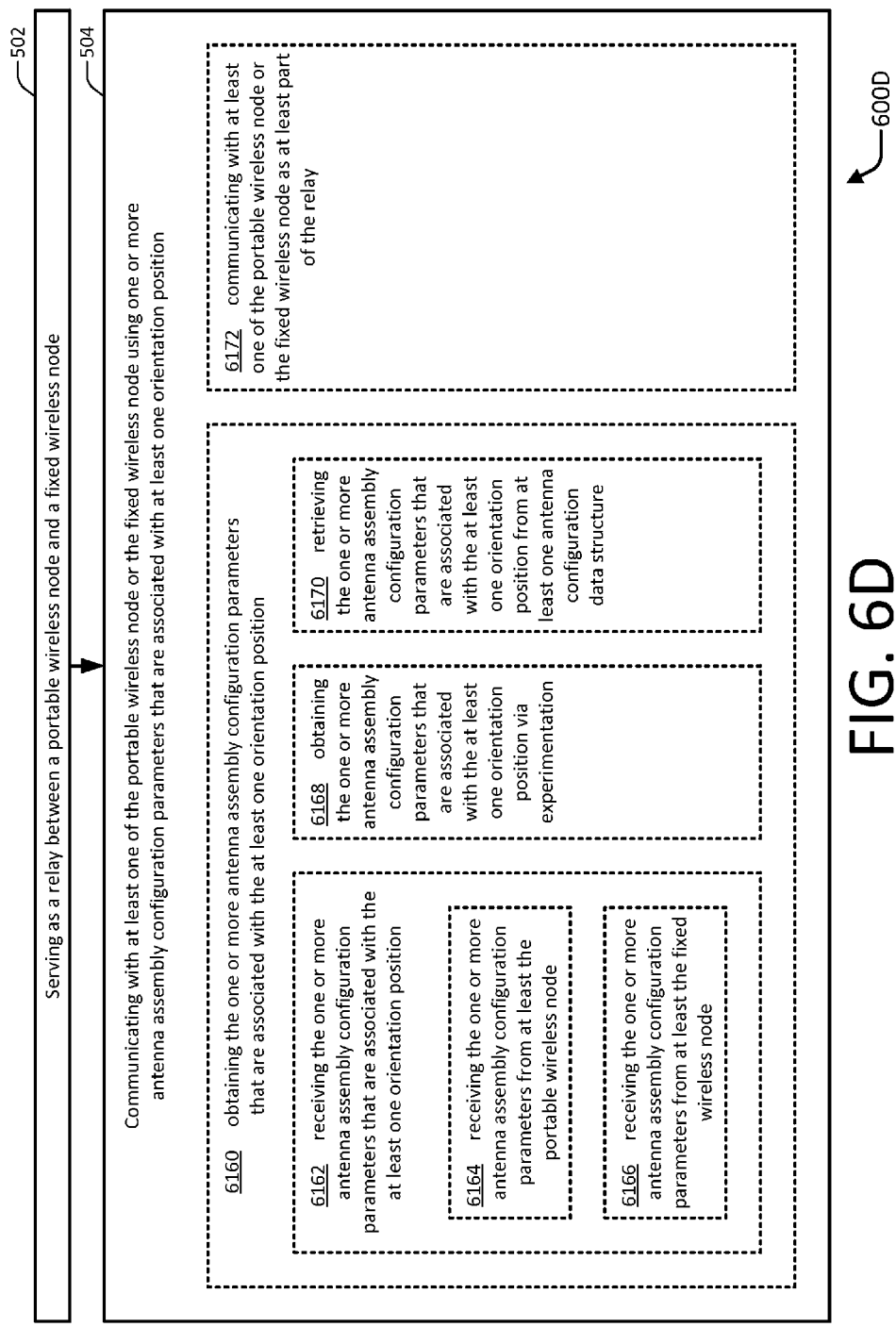

FIG. 6D illustrates a flow diagram 600D having any one or more of example operations 6160-6172. For example, an operation 504 may include an operation 6160 of obtaining the one or more antenna assembly configuration parameters that are associated with the at least one orientation position. For instance, at least one auxiliary relay item (e.g., an auxiliary relay item 1036, such as a smart shoe or an attachment thereto) may obtain (e.g., acquire, ascertain, determine, receive, retrieve, or a combination thereof, etc.) one or more antenna assembly configuration parameters 1070 (e.g., at least one variable impacting functionality of an antenna assembly or electromagnetic radiation emanated therefrom or collected thereby, at least one mechanism affecting antenna assembly performance, at least one value applied to an antenna assembly control or data input, at least one boundary or guideline for how electromagnetic fields interact with an adjustable antenna assembly, at least one manipulation of signals being forwarded to or accepted from an antenna assembly, one or more phase delays, one or more meta-material antenna control signal values, one or more phased-array antenna operational inputs, one or more antenna element or junction selection indicators, or a combination thereof, etc.) that are associated with (e.g., that correspond to, that are linked to, that relate to, that pertain to, that are matched with, that are mated to, that are derived from, or a combination thereof, etc.) at least one orientation position 1072OP (e.g., a direction that is being faced toward or pointed to, a ray in space, an Euler value, a roll or pitch or yaw value, a rotational position, an angle of inclination or declination, a vector or normal described—such as defined—relative to a face or edge of a device, or a combination thereof, etc.).

For example, an operation 6160 may include an operation 6162 of receiving the one or more antenna assembly configuration parameters that are associated with the at least one orientation position. For instance, at least one auxiliary relay item (e.g., an auxiliary relay item 1036, such as a smart watch) may receive (e.g., accept, decode, demodulate, down-convert, detect, obtain from or via a communication or transmission from another, route from an antenna or antenna element, take into possession wirelessly, or a combination thereof, etc.) one or more antenna assembly configuration parameters 1070 (e.g., at least one variable, value, or control setting impacting functionality of an antenna assembly or electromagnetic radiation emanated therefrom or collected thereby) that are associated with (e.g., that correspond to) at least one orientation position 1072OP (e.g., an angle at which a device is held or propped up).

For example, an operation 6162 may include an operation 6164 of receiving the one or more antenna assembly configuration parameters from at least the portable wireless node. For instance, at least one auxiliary relay item (e.g., an auxiliary relay item 1036, such as an intelligent anklet) may receive (e.g., accept) one or more antenna assembly configuration parameters 1070 (e.g., at least one value applied directly or indirectly to an antenna assembly control or data input) from at least a portable wireless node 1002P (e.g., a web-connected device having computing resources and an ability to present images on a separate or an integrated physical screen or projected display).

For example, an operation 6162 may include an operation 6166 of receiving the one or more antenna assembly configuration parameters from at least the fixed wireless node. For instance, at least one auxiliary relay item (e.g., an auxiliary relay item 1036, such as a smart watch) may receive (e.g., route from an antenna or antenna element thereof) one or more antenna assembly configuration parameters 1070 (e.g., one or more meta-material antenna control signals or signal values) from at least a fixed wireless node 1002F (e.g., a wireless router).

For example, an operation 6160 may include an operation 6168 of obtaining the one or more antenna assembly configuration parameters that are associated with the at least one orientation position via experimentation. For instance, at least one auxiliary relay item (e.g., an auxiliary relay item 1036, such as a smart bracelet) may obtain (e.g., determine) one or more antenna assembly configuration parameters 1070 (e.g., at least one guideline or instruction or setting for how electromagnetic fields are to interact with an adjustable antenna assembly) that are associated with (e.g., that are matched with) at least one orientation position 1072OP (e.g., a number of specified degrees with regard to a zero-degree reference vector) via experimentation (e.g., trial-and-error, testing, adjustment based at least partially on feedback from a wireless node during or after sending out a wireless signal, changes responsive to at least one measured sensor reading or signal strength, or a combination thereof, etc.).

For example, an operation 6160 may include an operation 6170 of retrieving the one or more antenna assembly configuration parameters that are associated with the at least one orientation position from at least one antenna configuration data structure. For instance, at least one auxiliary relay item (e.g., an auxiliary relay item 1036, such as a smart watch) may retrieve (e.g., acquire, read, extract, load, find via a search, or a combination thereof, etc.) one or more antenna assembly configuration parameters 1070 (e.g., at least one mechanism affecting antenna assembly performance—such as beam direction or coverage area) that are associated with (e.g., that are linked to) at least one orientation position 1072OP (e.g., one or more values, such as matrices, representing one or more, such as three, elemental rotations) from at least one antenna configuration data structure 1008 (e.g., a searchable database or table that includes multiple entries linking respective sets of rotational angles of a device with respective descriptions of adjusting or using an antenna assembly of the device at such a set of rotational angles).

For example, an operation 504 may include an operation 6172 of communicating with at least one of the portable wireless node or the fixed wireless node as at least part of the relay. For instance, at least one auxiliary relay item (e.g., an auxiliary relay item 1036, such as a smart bracelet) may communicate (e.g., impart, transmit, receive, exchange, broadcast, accept delivery, send, or a combination, thereof, etc. via at least one communication 4108 information, data, knowledge, bits, or a combination thereof, etc.) with at least one of a portable wireless node 1002P (e.g., an Apple iPad) or a fixed wireless node 1002F (e.g., an Apple Airport Extreme base station) as at least part of a relay 4110 (e.g., a forwarder, an intermediary, a device or entity or unit that receives from a source and transmits to a destination, a repeater, a go-between, an inter-agent, an electronic mediator, a process involving same, or a combination thereof, etc.).

Figure 6E:
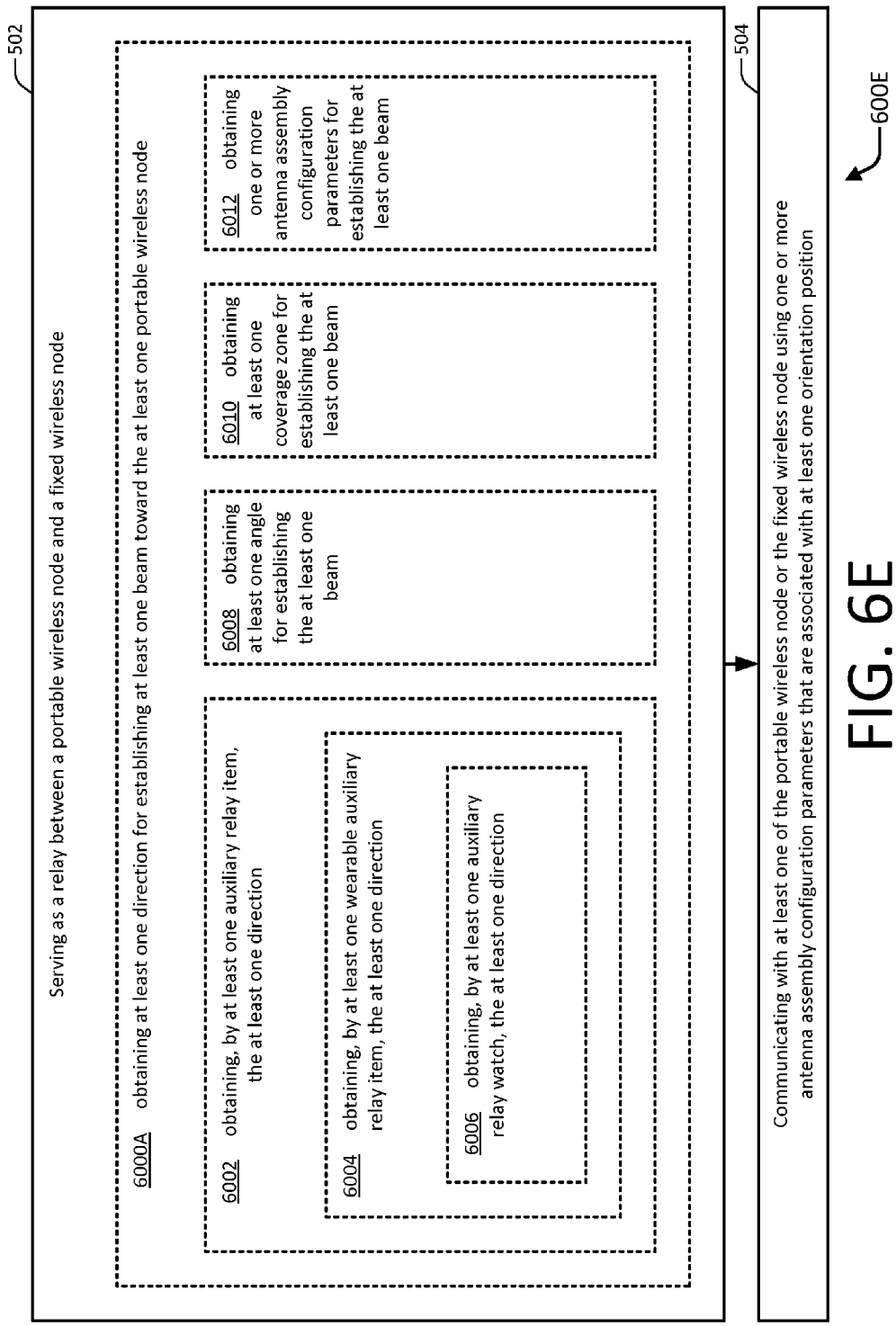
FIGS. 6E-6G depict other example additions or alternatives for a flow diagram of FIG. 5 in accordance with certain example embodiments.

FIG. 6E illustrates a flow diagram 600E having any one or more of example operations 6000A and 6002-6012. For example, an operation 502 may include an operation 6000A of obtaining at least one direction for establishing at least one beam toward the at least one portable wireless node. For certain example implementations, at least one device (e.g., an auxiliary relay item (ARI) 1036, such as a smart watch) may obtain (e.g., acquire, ascertain, determine, receive, retrieve, calculate, procure, estimate, or a combination thereof, etc. via at least one obtainment 4006 (e.g., of FIG. 4D)) at least one direction 4010 (e.g., angle, vector in space, location with respect to either or both devices engaging in, location for forming an antenna beam, a line pointing away or towards something, an emanation direction, in an identified emanation direction with respect to or away from a given portion or part of an auxiliary relay item, not omnidirectionally, a reception direction, an identified coverage area, 5 or 10 or 30 etc. arc degrees in width with respect to a designated vector, an identified azimuth angle, an identified elevation angle, or a combination thereof, etc.) for establishing (e.g., producing, creating, engaging in, bringing about, effecting, or a combination thereof, etc.) at least one beam 1028 (e.g., focused electromagnetic communication, directed emanation or reception, antenna beam pattern, coverage area for RF signaling, non-omnidirectional wireless communication, a hemispherical pattern (e.g., approximately 180 degrees), or a combination thereof, etc.) toward at least one portable wireless node 1002P (e.g., a mobile device, a mobile phone, a tablet, a slate computer, a phablet, a portable gaming device, a smartphone, a notebook computer, a mobile repeater, a user equipment (UE), a mobile station (MS), a laptop computer, a hand-held radio, a wireless component for a vehicle, a walker-talkie, a roving transceiver, a wireless device that moves under its own power or control (e.g., an autonomous motorized robot or an unmanned aerial vehicle (UAV)), a wireless device that moves under the power or control of another entity (e.g., a vehicle or a remotely-piloted craft that is controlled by either a passenger or a remote human or by a remote machine), or a combination thereof, etc.).

For example, an operation 6000A may include an operation 6002 of obtaining, by at least one auxiliary relay item, the at least one direction. For instance, at least one auxiliary relay item (e.g., an auxiliary relay item 1036, such as an electronic couch or desk) may obtain (e.g., acquire), by at least one auxiliary relay item 1036 (e.g., an electronic couch or desk), at least one direction 4010 (e.g., an angle).

For example, an operation 6002 may include an operation 6004 of obtaining, by at least one wearable auxiliary relay item, the at least one direction. For instance, at least one auxiliary relay item (e.g., an auxiliary relay item 1036, such as a messenger bag) may obtain (e.g., ascertain), by at least one wearable auxiliary relay item 1036\*(e.g., a messenger bag), at least one direction 4010 (e.g., an area specified with respect to a location of or a part of a messenger bag).

For example, an operation 6004 may include an operation 6006 of obtaining, by at least one auxiliary relay watch, the at least one direction. For instance, at least one auxiliary relay item (e.g., an auxiliary relay item 1036, such as a smart watch) may obtain (e.g., determine), by at least one auxiliary relay watch 1036W (e.g., a smart watch), at least one direction 4010 (e.g., a vector having a beginning point specified with respect to a "face" of a smart watch).

For example, an operation 6000A may include an operation 6008 of obtaining at least one angle for establishing the at least one beam. For instance, at least one auxiliary relay item (e.g., an auxiliary relay item 1036, such as an electronic hat) may obtain (e.g., ascertain) at least one angle 4020 (e.g., azimuth angle, elevation angle, rotational angle, number of degrees or radians, amount of inclination or declination from a given reference point—such as gravitational force, amount of rotational movement from a particular orientation—such as magnetic north or a face or edge of a device, or a combination thereof, etc.) for establishing (e.g., producing) at least one beam 1028 (e.g., focused electromagnetic communication).

For example, an operation 6000A may include an operation 6010 of obtaining at least one coverage zone for establishing the at least one beam. For instance, at least one auxiliary relay item (e.g., an auxiliary relay item 1036, such as smart glasses) may obtain (e.g., receive) at least one coverage zone 4022 (e.g., spatial area, body location to aim an RF signal transmission or reception operation, volume to target, distance to aim main lobe of antenna beam, or a combination thereof, etc.) for establishing (e.g., effecting) at least one beam 1028 (e.g., coverage area for RF signaling).

For example, an operation 6000A may include an operation 6012 of obtaining one or more antenna assembly configuration parameters for establishing the at least one beam. For instance, at least one auxiliary relay item (e.g., an auxiliary relay item 1036, such as a smart bracelet) may obtain (e.g., retrieve) one or more antenna assembly configuration parameters 1070 (e.g., at least one variable impacting functionality of an antenna assembly or electromagnetic radiation emanating therefrom or collecting thereby, at least one mechanism affecting antenna assembly performance, at least one value applied to an antenna assembly control or data input, at least one boundary or guideline for how electromagnetic fields are to interact with an adjustable antenna assembly, at least one description of how to manipulate signals being forwarded to or accepted from an antenna assembly, at least one indication of a direction to point an antenna beam, at least one indication of a pattern in which to form an antenna beam, one or more phase delays, meta-material antenna control signal values, phased-array antenna operational inputs, antenna element or junction selection indicators, or a combination thereof, etc.) for establishing (e.g., engaging in) at least one beam 1028 (e.g., directed emanation or reception).

Figure 6F:
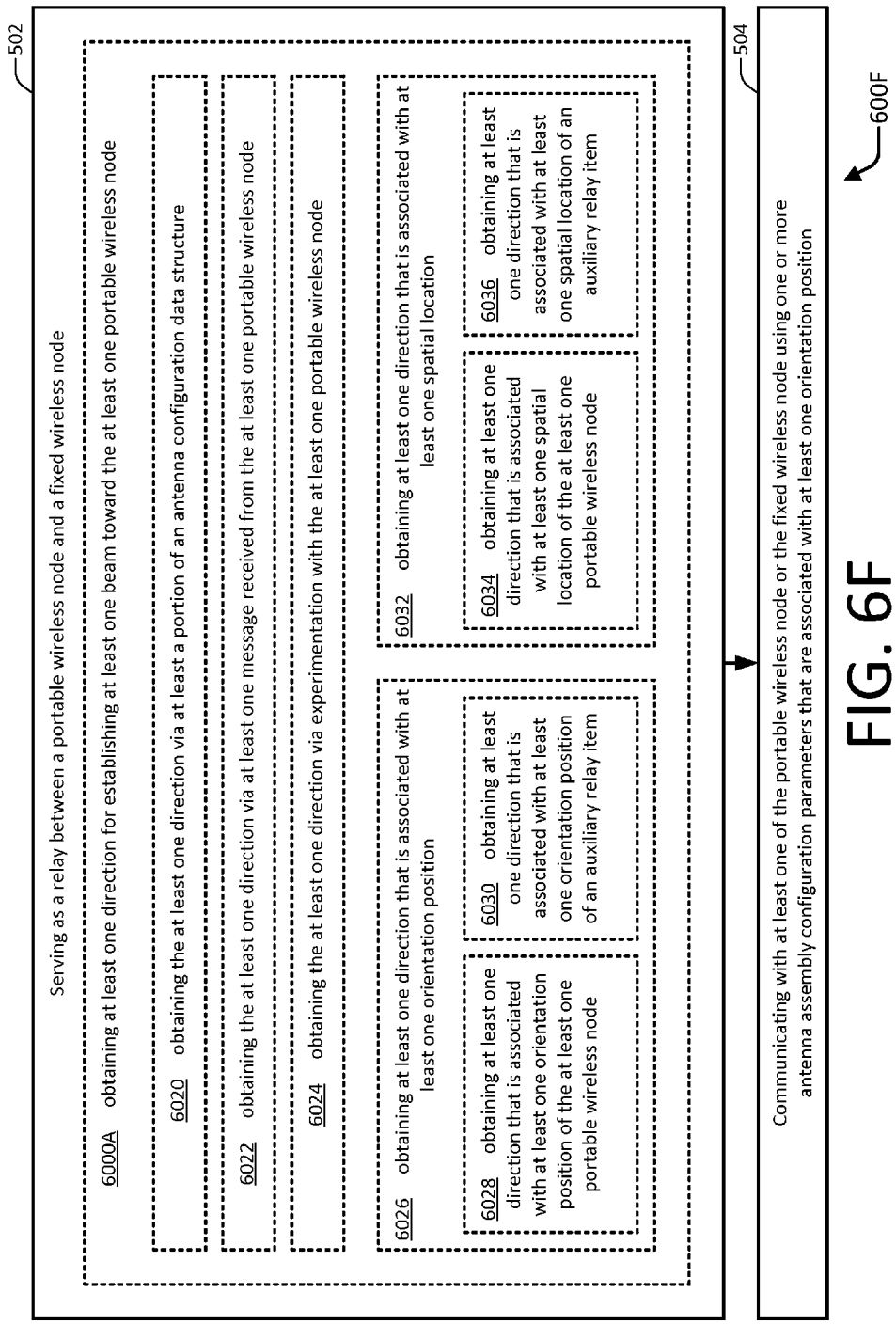

FIG. 6F illustrates a flow diagram 600F having any one or more of example operations 6020-6036 (and 6000A). For example, an operation 6000A may include an operation 6020 of obtaining the at least one direction via at least a portion of an antenna configuration data structure. For instance, at least one auxiliary relay item (e.g., an auxiliary relay item 1036, such as a wireless anklet) may obtain (e.g., retrieve) at least one direction 4010 (e.g., location with respect to auxiliary relay wireless anklet) via at least a portion of an antenna configuration data structure 1008 (e.g., of FIG. 1E or 1F) (e.g., a table or spreadsheet or SQL database having one or more conditions that are associated with at least one antenna assembly configuration parameter).

For example, an operation 6000A may include an operation 6022 of obtaining the at least one direction via at least one message received from the at least one portable wireless node. For instance, at least one auxiliary relay item (e.g., an auxiliary relay item 1036, such as an Apple iWatch) may obtain (e.g., acquire) at least one direction 4010 (e.g., a targeted location) via at least one message 4026 (e.g., communication, packet, signal, group of transmitted bits, announcement, notification, or a combination thereof, etc.) received (e.g., accepted, decoded, detected, routed from an antenna assembly, or a combination thereof, etc.) from at least one portable wireless node 1002P (e.g., an Apple iPhone).

For example, an operation 6000A may include an operation 6024 of obtaining the at least one direction via experimentation with the at least one portable wireless node. For instance, at least one auxiliary relay item (e.g., an auxiliary relay item 1036, such as an Android-based tablet) may obtain (e.g., determine) at least one direction 4010 (e.g., one or more angles or corresponding antenna assembly configuration parameters) via experimentation 4024 (e.g., trial and error, testing and analyzing results, sending a signal and ascertaining a target's receptive ability, analyzing received signals from one or more beams sent by a counterpart node, transmitting multiple antenna beams with codes over time and ascertaining which are received with better signal strengths, or a combination thereof, etc.) with at least one portable wireless node 1002P (e.g., Google glasses).

For example, an operation 6000A may include an operation 6026 of obtaining at least one direction that is associated with at least one orientation position. For instance, at least one auxiliary relay item (e.g., an auxiliary relay item 1036, such as a Hon Hai/Foxconn smart watch) may obtain (e.g., determine) at least one direction (e.g., vector away from an auxiliary relay item device) that is associated with (e.g., that corresponds to, that is linked to, that relates to, that pertains to, that is matched with, that is mated to, that is derived from, or a combination thereof, etc.) at least one orientation position 1072OP (e.g., a direction that is being faced toward or pointed to, a vector in space—such as a normal to a face or an edge of a device, an Euler value, a roll or pitch or yaw value, a value representing a tilt, a rotational position, an angle of inclination or declination, an equation defining a geometric object—such as a plane—having a determinable relationship to a position of a mobile device—such as lying within or being parallel thereto, or a combination thereof, etc.).

For example, an operation 6026 may include an operation 6028 of obtaining at least one direction that is associated with at least one orientation position of the at least one portable wireless node. For instance, at least one auxiliary relay item (e.g., an auxiliary relay item 1036, such as a belt or fanny pack) may obtain (e.g., calculate) at least one direction (e.g., in an identified emanation direction with respect to or away from a given portion or part of a belt or fanny pack) that is associated with (e.g., that is linked to) at least one orientation position 1072OP (e.g., at least one Euler value) of at least one portable wireless node 1002P (e.g., a Samsung Galaxy S smart phone).

For example, an operation 6026 may include an operation 6030 of obtaining at least one direction that is associated with at least one orientation position of an auxiliary relay item. For instance, at least one auxiliary relay item (e.g., an auxiliary relay item 1036, such as a smart watch) may obtain (e.g., ascertain via experimentation) at least one direction (e.g., a reception direction) that is associated with (e.g., that pertains to) at least one orientation position 1072OP (e.g., a vector in space—such as a normal to a face or an edge of a device) of an auxiliary relay item 1036 (e.g., a smart watch).

For example, an operation 6000A may include an operation 6032 of obtaining at least one direction that is associated with at least one spatial location. For instance, at least one auxiliary relay item (e.g., an auxiliary relay item 1036, such as a back pack) may obtain (e.g., procure) at least one direction (e.g., a determinable number of degrees on either side of a designated vector) that is associated with (e.g., that corresponds to, that is linked to, that relates to, that pertains to, that is matched with, that is mated to, that is derived from, or a combination thereof, etc.) at least one spatial location 1072SL (e.g., geographical/geospatial position, elevation position, floor level, room identification, GPS coordinates, distance from known object, height, location relative to human body, location being worn, or a combination thereof, etc.).

For example, an operation 6032 may include an operation 6034 of obtaining at least one direction that is associated with at least one spatial location of the at least one portable wireless node. For instance, at least one auxiliary relay item (e.g., an auxiliary relay item 1036, such as a power supply unit) may obtain (e.g., ascertain) at least one direction (e.g., angle) that is associated with (e.g., that is linked to) at least one spatial location 1072SL (e.g., GPS coordinates) of at least one portable wireless node 1002 (e.g., a tablet computer).

For example, an operation 6032 may include an operation 6036 of obtaining at least one direction that is associated with at least one spatial location of an auxiliary relay item. For instance, at least one auxiliary relay item (e.g., an auxiliary relay item 1036, such as a smart watch) may obtain (e.g., estimate) at least one direction (e.g., location for forming an antenna beam) that is associated with (e.g., that is derived from) at least one spatial location 1072SL (e.g., location being worn) of an auxiliary relay item 1036 (e.g., smart watch).

Figure 6G:
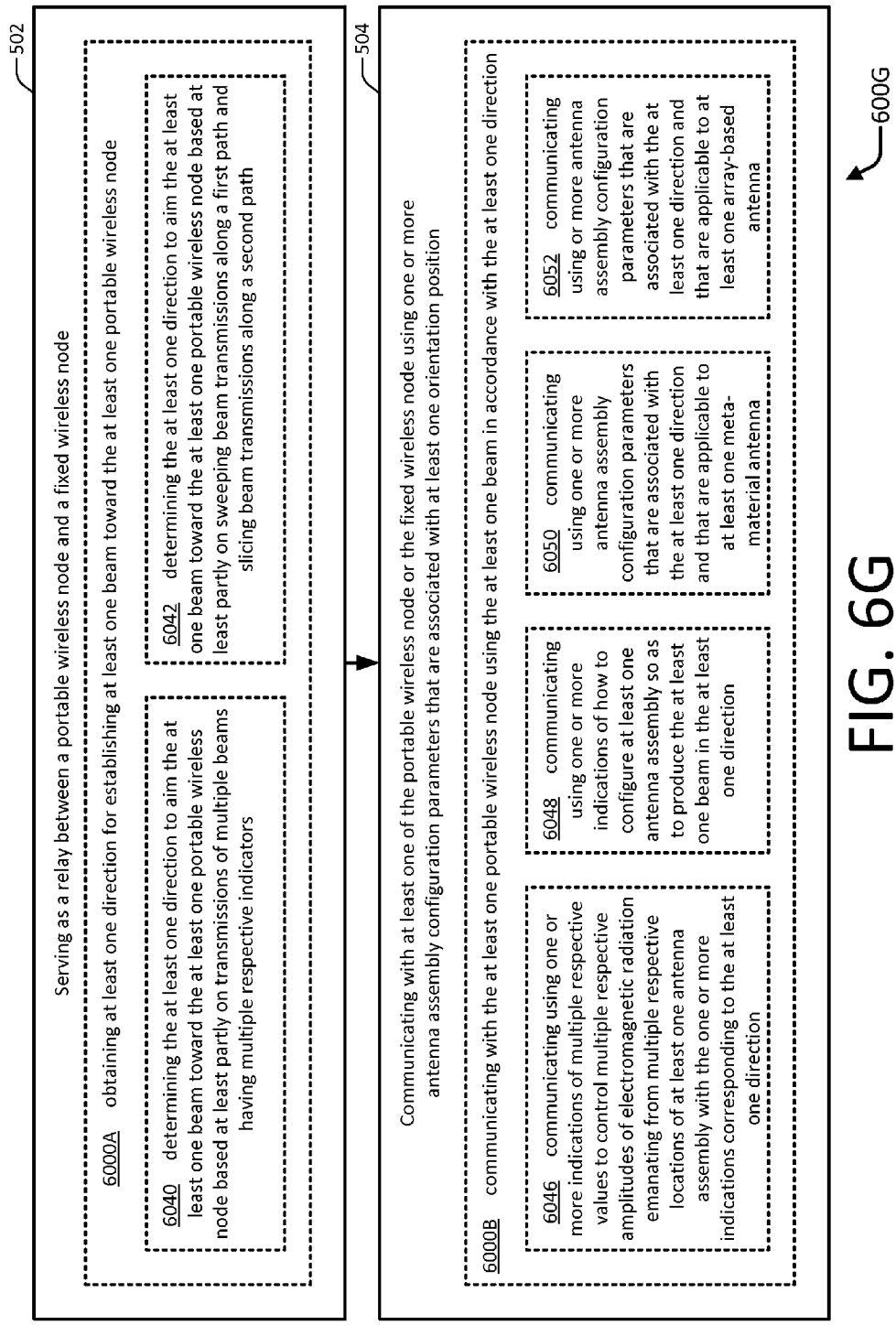

FIG. 6G illustrates a flow diagram 600G having any one or more of example operations 6000B, 6040, 6042, and 6046-6052 (and 6000A). For example, an operation 6000A may include an operation 6040 of determining the at least one direction to aim the at least one beam toward the at least one portable wireless node based at least partly on transmissions of multiple beams having multiple respective indicators. For instance, at least one auxiliary relay item (e.g., an auxiliary relay item 1036, such as an electronic wrist band or smart watch) may determine (e.g., ascertain, calculate, conclude, deduce, decide upon, compute, estimate, produce plans for, or a combination thereof, etc.) at least one direction 4010 (e.g., angle, vector in space, location with respect to either or both devices engaging in a communication, location for forming an antenna beam, a line pointing away or towards something, an antenna assembly configuration parameter, an emanation direction, a reception direction, an identified coverage area, or a combination thereof, etc.) to aim (e.g., point, position, strive to place, attempt to position, or a combination thereof, etc.) at least one beam 1028 (e.g., focused electromagnetic communication, directed emanation or reception, antenna beam pattern, coverage area for RF signaling, non-omnidirectional wireless communication, or a combination thereof, etc.) toward at least one portable wireless node 1002P (e.g., a laptop) based at least partly on transmissions (e.g., emanation, transference, engagement, sending out, or a combination thereof, etc.) of multiple beams 1028 having multiple respective indicators 4032 (e.g., designation, expression, alphanumeric identifier, indirect identification, direct identification, modulation difference, reference, code, value, or a combination thereof, etc.).

For example, an operation 6000A may include an operation 6042 of determining the at least one direction to aim the at least one beam toward the at least one portable wireless node based at least partly on sweeping beam transmissions along a first path and slicing beam transmissions along a second path. For instance, at least one auxiliary relay item (e.g., an auxiliary relay item 1036, such as an electronic clothing insert) may determine (e.g., ascertain, calculate, conclude, deduce, decide upon, compute, estimate, produce plans for, or a combination thereof, etc.) at least one direction 4010 (e.g., angle, vector in space, location with respect to either or both devices engaging in a communication, location for forming an antenna beam, a line pointing away or towards something, an antenna assembly configuration parameter, an emanation direction, a reception direction, an identified coverage area, or a combination thereof, etc.) to aim (e.g., point, position, strive to place, attempt to position, or a combination thereof, etc.) at least one beam 1028 (e.g., focused electromagnetic communication, directed emanation or reception, antenna beam pattern, coverage area for RF signaling, non-omnidirectional wireless communication, or a combination thereof, etc.) toward at least one portable wireless node 1002P (e.g., Apple iPad) based at least partly on sweeping (e.g., moving, gliding, passing over with smooth movement in an arc, shifting in steps, or a combination thereof, etc.) beam transmissions (e.g., emanation, transference, engagement, sending out, or a combination thereof, etc. of at least one beam) along a first path (e.g., horizontally, left-to-right or vice versa, along a horizon, along an azimuth angle, or a combination thereof, etc.) and slicing (e.g., moving, gliding, passing over with smooth movement in an arc, shifting in steps, or a combination thereof, etc.) beam transmissions along a second path (e.g., vertically, high-to-low or vice versa, up or down, along an angle of elevation, or a combination thereof, etc.).

For example, an operation 504 may include an operation 6000B of communicating with the at least one portable wireless node using the at least one beam in accordance with the at least one direction. For certain example implementations, at least one device (e.g., an auxiliary relay item (ARI) 1036, such as an intelligent bracelet) may communicate (e.g., impart, transmit, receive, exchange, broadcast, accept delivery, send, or a combination, thereof, etc. information, data, knowledge, bits, or a combination thereof, etc. via at least one communication 4008 (e.g., of FIG. 4D)) with at least one portable wireless node 1002P (e.g., a smart phone) using (e.g., employing, relying at least partially on, engaging in, processing electromagnetic signals based at least partially on, transceiving with an antenna assembly configured to produce, or a combination thereof, etc.) at least one beam 1028 (e.g., a focused, non-omni-directional radio frequency (RF) coverage area) in accordance with (e.g., comporting with, substantially matching, derived from, corresponding to, having a central or primary lobe pointing in, or a combination thereof, etc.) at least one direction 4010 (e.g., identified vector in space).

For example, an operation 6000B may include an operation 6046 of communicating using one or more indications of multiple respective values to control multiple respective amplitudes of electromagnetic radiation emanating from multiple respective locations of at least one antenna assembly with the one or more indications corresponding to the at least one direction. For instance, at least one auxiliary relay item (e.g., an auxiliary relay item 1036, such as an electronic wrist band) may communicate (e.g., transmit or receive) using one or more indications 4028 of (e.g., code for, reference to, actual numerals of, or a combination thereof, etc.) multiple respective values (e.g., numeral or variable name or table entry) to control (e.g., adjust, set, guide, impact, cause to occur, or a combination thereof, etc.) multiple respective amplitudes (e.g., magnitude) of electromagnetic radiation (e.g., radio frequency waves) emanating (e.g., transmitting) from multiple respective locations (e.g., position or coordinate or part or element or portion) of at least one antenna assembly 1006 (e.g., at least one antenna with one or more radiating elements, at least one meta-material antenna 1006MM, at least one array-based antenna 1006AR/1006PH, or a combination thereof, etc.) with one or more indications 4028 corresponding to at least one direction 4010 (e.g., a line pointing away or towards something).

For example, an operation 6000B may include an operation 6048 of communicating using one or more indications of how to configure at least one antenna assembly so as to produce the at least one beam in the at least one direction. For instance, at least one auxiliary relay item (e.g., an auxiliary relay item 1036, such as a portable speaker) may communicate (e.g., receive media signals) using one or more indications 4030 (e.g., phase shift value(s), temporal delay value(s), phased array value(s), antenna element subset(s), resonant frequency adjustor control value(s), direction or shape of electromagnetic coverage zone, patch antenna selection(s), antenna junction(s) utilized, or a combination thereof, etc.) of how to configure (e.g., employ, operate, adjust, apply, exploit, set up, initialize, or a combination thereof, etc.) at least one antenna assembly 1006 (e.g., at least one antenna with one or more radiating elements, at least one meta-material antenna 1006MM, at least one array-based antenna 1006AR/1006PH, or a combination thereof, etc.) so as to produce (e.g., generate, create, instantiate, or a combination thereof, etc.) at least one beam 1028 (e.g., focused electromagnetic communication) in at least one direction 4060 (e.g., toward a particular fixed wireless node, in an identified emanation direction with respect to or away from a given portion or part of an auxiliary relay item, not omni-directionally, a hemispherical pattern (e.g., approximately 180 degrees), a narrow beam, less than 5 or 10 or 30 etc. arc degrees in width with respect to a designated vector, an identified azimuth angle, or a combination thereof, etc.).

For example, an operation 6000B may include an operation 6050 of communicating using one or more antenna assembly configuration parameters that are associated with the at least one direction and that are applicable to at least one meta-material antenna. For instance, at least one auxiliary relay item (e.g., an auxiliary relay item 1036, such as a jacket insert) may communicate (e.g., transceive) using (e.g., employing, relying at least partially on, processing electromagnetic signals based at least partially on, transceiving with an antenna assembly configured with, operating an antenna set up by, or a combination thereof, etc.) one or more antenna assembly configuration parameters 1070 (e.g., at least one variable impacting functionality of an antenna assembly or electromagnetic radiation emanating therefrom or collecting thereby, at least one mechanism affecting antenna assembly performance, at least one value applied to an antenna assembly control or data input, at least one boundary or guideline for how electromagnetic fields are to interact with an adjustable antenna assembly, at least one description of how to manipulate signals being forwarded to or accepted from an antenna assembly, at least one indication of a direction to point an antenna beam, at least one indication of a pattern in which to form an antenna beam, one or more phase delays, meta-material antenna control signal values, phased-array antenna operational inputs, antenna element or junction selection indicators, or a combination thereof, etc.) that are associated with (e.g., that correspond to, that are linked to, that relate to, that pertain to, that are matched with, that are mated to, that are derived from, or a combination thereof, etc.) at least one direction 4010 (e.g., hemispherical portion of space) and that are applicable to (e.g., pertinent to, operable with, usable to configure, or a combination thereof, etc.) at least one meta-material antenna 1006MM (e.g., surface scattering antenna).

For example, an operation 6000B may include an operation 6052 of communicating using or more antenna assembly configuration parameters that are associated with the at least one direction and that are applicable to at least one array-based antenna. For instance, at least one auxiliary relay item (e.g., an auxiliary relay item 1036, such as a hat 1036H) may communicate (e.g., impart or accept) using (e.g., employing, relying at least partially on, processing electromagnetic signals based at least partially on, transceiving with an antenna assembly configured with, operating an antenna set up by, or a combination thereof, etc.) one or more antenna assembly configuration parameters 1070 (e.g., at least one variable impacting functionality of an antenna assembly or electromagnetic radiation emanating therefrom or collecting thereby, at least one mechanism affecting antenna assembly performance, at least one value applied to an antenna assembly control or data input, at least one boundary or guideline for how electromagnetic fields are to interact with an adjustable antenna assembly, at least one description of how to manipulate signals being forwarded to or accepted from an antenna assembly, at least one indication of a direction to point an antenna beam, at least one indication of a pattern in which to form an antenna beam, one or more phase delays, meta-material antenna control signal values, phased-array antenna operational inputs, antenna element or junction selection indicators, or a combination thereof, etc.) that are associated with (e.g., that correspond to, that are linked to, that relate to, that pertain to, that are matched with, that are mated to, that are derived from, or a combination thereof, etc.) at least one direction 4010 (e.g., non-omni-directional vector in space or location of target relative to auxiliary relay item) and that are applicable to (e.g., pertinent to, operable with, usable to configure, or a combination thereof, etc.) at least one array-based antenna 1006AR/1006PH/1006*(e.g., beam-forming phased-array antenna).

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus for portable wireless node auxiliary relay, the apparatus comprising:
    circuitry configured for associating a portable wireless node auxiliary relay as an auxiliary of a portable wireless node;
    circuitry configured for serving as a relay between the portable wireless node and a fixed wireless node including at least circuitry configured for detecting at least one indication of at least one location of human tissue based at least partly on at least one sensor; and
    circuitry configured for communicating with at least one of the portable wireless node or the fixed wireless node including circuitry configured for selecting one or more antenna assembly configuration parameters that are associated with at least one orientation position based at least in part on association of the portable wireless node auxiliary relay as an auxiliary of the portable wireless node and the at least one indication of at least one location of human tissue.

2. The apparatus of claim 1, wherein the circuitry configured for serving as a relay between the portable wireless node and a fixed wireless node comprises:
    circuitry configured for serving as at least a unidirectional relay between the portable wireless node and the fixed wireless node.

3. The apparatus of claim 1, wherein the circuitry configured for serving as a relay between the portable wireless node and a fixed wireless node comprises:
    circuitry configured for serving as a bidirectional relay between the portable wireless node and the fixed wireless node.

4. The apparatus of claim 1, wherein the circuitry configured for serving as a relay between the portable wireless node and a fixed wireless node comprises:
    circuitry configured for establishing at least one relay protocol with at least one of the portable wireless node or the fixed wireless node.

5. The apparatus of claim 4, wherein the circuitry configured for establishing at least one relay protocol with at least one of the portable wireless node or the fixed wireless node comprises:
    circuitry configured for indicating at least one relay status to the portable wireless node.

6. The apparatus of claim 1, wherein the circuitry configured for serving as a relay between a portable wireless node and a fixed wireless node comprises:
    circuitry configured for providing to the portable wireless node at least one indication of a location of an auxiliary relay item.

7. An apparatus for portable wireless node auxiliary relay, the apparatus comprising:
    circuitry configured for associating a portable wireless node auxiliary relay as an auxiliary of a portable wireless node;
    circuitry configured for serving as a relay between the portable wireless node and a fixed wireless node including circuitry configured for providing to the portable wireless node at least one indication of a location of an auxiliary relay item with respect to a human body on which the auxiliary relay item is being worn: and circuitry configured for communicating with at least one of the portable wireless node or the fixed wireless node including circuitry configured for selecting one or more antenna assembly configuration parameters that are associated with at least one orientation position based at least in part on association of the portable wireless node auxiliary relay as an auxiliary of the portable wireless node and the at least one indication of a location of the auxiliary relay item.

8. The apparatus of claim 1, wherein the circuitry configured for serving as a relay between the portable wireless node and a fixed wireless node comprises:

circuitry configured for serving as a relay to facilitate at least partial avoidance of at least one impediment to communication between the portable wireless node and the fixed wireless node.

9. The apparatus of claim 8, wherein the circuitry configured for serving as a relay to facilitate at least partial avoidance of at least one impediment to communication between the portable wireless node and the fixed wireless node comprises:

circuitry configured for serving as a relay to facilitate at least partial avoidance of human tissue exposure to electromagnetic radiation resulting from wireless communication between the portable wireless node and the fixed wireless node.

10. The apparatus of claim 1, wherein the circuitry configured for serving as a relay between the portable wireless node and a fixed wireless node comprises:

circuitry configured for detecting at least one indication of at least one location of human tissue.

11. An apparatus for portable wireless node auxiliary relay, the apparatus comprising:

circuitry configured for associating a portable wireless node auxiliary relay as an auxiliary of a portable wireless node;

circuitry configured for serving as a relay between the portable wireless node and a fixed wireless node including circuitry configured for detecting at least one indication of at least one location of human tissue that may be pertinent to communication with at least one of the portable wireless node or the fixed wireless node; and circuitry configured for communicating with at least one of the portable wireless node or the fixed wireless node including circuitry configured for selecting one or more antenna assembly configuration parameters that are associated with at least one orientation position based at least in part on association of the portable wireless node auxiliary relay as an auxiliary of the portable wireless node and the at least one indication of at least one location of human tissue.

12. An apparatus for portable wireless node auxiliary relay, the apparatus comprising:

circuitry configured for associating a portable wireless node auxiliary relay as an auxiliary of a portable wireless node;

circuitry configured for serving as a relay between the portable wireless node and a fixed wireless node including at least circuitry configured for detecting at least one indication of at least one location of human tissue based at least partly on at least one test beam emanation; and circuitry configured for communicating with at least one of the portable wireless node or the fixed wireless node including circuityr configured for selecting one or more antenna assembly configuration parameters that are associated with at least one orientation position based at least in part on association of the portable wireless node auxiliary relay as an auxiliary of the portable wireless node and the at least one indication of at least one location of human tissue.

13. The apparatus of claim 1, wherein the circuitry configured for communicating with at least one of the portable wireless node or the fixed wireless node including circuitry configured for selecting one or more antenna assembly configuration parameters that are associated with at least one orientation position comprises:

circuitry configured for selecting at least one beam that is directed at least partially away from at least one obstacle.

14. An apparatus for portable wireless node auxiliary relay, the apparatus comprising:

circuitry configured for associating the portable wireless node auxiliary relay as an auxiliary of a portable wireless node;

circuitry configured for serving as a relay between the portable wireless node and a fixed wireless node; and circuitry configured for communicating with at least one of the portable wireless node or the fixed wireless node including circuitry configured for selecting one or more antenna assembly configuration parameters that are associated with at least one orientation position including at least:

circuitry configured for selecting at least one beam that is directed at least partially away from a detected at least one location of human tissue.

15. The apparatus of claim 1, wherein the circuitry configured for communicating with at least one of the portable wireless node or the fixed wireless node including circuitry configured for selecting one or more antenna assembly configuration parameters that are associated with at least one orientation position comprises:

circuitry configured for selecting one or more antenna assembly configuration parameters that are associated with at least one orientation position of an auxiliary relay item associated with the portable wireless node auxiliary relay as an auxiliary of a portable wireless node.

16. An apparatus for portable wireless node auxiliary relay, the apparatus comprising:

circuitry configured for associating a portable wireless node auxiliary relay as an auxiliary of a portable wireless node;

circuitry configured for serving as a relay between the portable wireless node and a fixed wireless node; and circuitry configured for communicating including circuitry configured for selecting one or more antenna assembly configuration parameters that are associated with at least one orientation position of an auxiliary relay item including at least:

circuitry configured for selecting one or more antenna assembly configuration parameters that are associated with at least one rotational position of the auxiliary relay item associated with the portable wireless node auxiliary relay as an auxiliary of a portable wireless node.

17. An apparatus for portable wireless node auxiliary relay, the apparatus comprising:

circuitry configured for associating a portable wireless node auxiliary relay as an auxiliary of a portable wireless node;
circuitry configured for serving as a relay between the portable wireless node and a fixed wireless node; and
circuitry configured for communicating including circuitry configured for selecting one or more antenna assembly configuration parameters that are associated with at least one orientation position of an auxiliary relay item including at least:
  circuitry configured for selecting one or more indications of one or more antenna element subsets that are associated with the at least one orientation position of the auxiliary relay item associated with the portable wireless node auxiliary relay as an auxiliary of a portable wireless node.

18. The apparatus of claim 1, wherein the circuitry configured for communicating with at least one of the portable wireless node or the fixed wireless node including circuitry configured for selecting one or more antenna assembly configuration parameters that are associated with at least one orientation position comprises:
  circuitry configured for obtaining the one or more antenna assembly configuration parameters that are associated with the at least one orientation position.

19. The apparatus of claim 18, wherein the circuitry configured for obtaining the one or more antenna assembly configuration parameters that are associated with the at least one orientation position comprises:
  circuitry configured for receiving the one or more antenna assembly configuration parameters that are associated with the at least one orientation position.

20. The apparatus of claim 18, wherein the circuitry configured for obtaining the one or more antenna assembly configuration parameters that are associated with the at least one orientation position comprises:
  circuitry configured for obtaining the one or more antenna assembly configuration parameters that are associated with the at least one orientation position via experimentation.

21. The apparatus of claim 18, wherein the circuitry configured for obtaining the one or more antenna assembly configuration parameters that are associated with the at least one orientation position comprises:
  circuitry configured for retrieving the one or more antenna assembly configuration parameters that are associated with the at least one orientation position from at least one antenna configuration data structure.

22. The apparatus of claim 1, wherein the circuitry configured for communicating with at least one of the portable wireless node or the fixed wireless node including circuitry configured for selecting one or more antenna assembly configuration parameters that are associated with at least one orientation position comprises:
  circuitry configured for communicating with at least one of the portable wireless node or the fixed wireless node as at least part of the relay.

23. The apparatus of claim 1, wherein the circuitry configured for serving as a relay between the portable wireless node and a fixed wireless node comprises:
  circuitry configured for obtaining at least one direction for establishing at least one beam toward the at least one portable wireless node.

24. The apparatus of claim 23, wherein the circuitry configured for obtaining at least one direction for establishing at least one beam toward the at least one portable wireless node comprises:
  circuitry configured for obtaining, by at least one auxiliary relay item associated with the portable wireless node auxiliary relay as an auxiliary of a portable wireless node, the at least one direction.

25. The apparatus of claim 24, wherein the circuitry configured for obtaining, by at least one auxiliary relay item associated with the portable wireless node auxiliary relay as an auxiliary of a portable wireless node, the at least one direction comprises:
  circuitry configured for obtaining, by at least one wearable auxiliary relay item associated with the portable wireless node auxiliary relay as an auxiliary of a portable wireless node, the at least one direction.

26. The apparatus of claim 23, wherein the circuitry configured for obtaining at least one direction for establishing at least one beam toward the at least one portable wireless node comprises:
  circuitry configured for obtaining at least one angle for establishing the at least one beam.

27. The apparatus of claim 23, wherein the circuitry configured for obtaining at least one direction for establishing at least one beam toward the at least one portable wireless node comprises:
  circuitry configured for obtaining at least one coverage zone for establishing the at least one beam.

28. The apparatus of claim 23, wherein the circuitry configured for obtaining at least one direction for establishing at least one beam toward the at least one portable wireless node comprises:
  circuitry configured for obtaining one or more antenna assembly configuration parameters for establishing the at least one beam.

29. The apparatus of claim 23, wherein the circuitry configured for obtaining at least one direction for establishing at least one beam toward the at least one portable wireless node comprises:
  circuitry configured for obtaining the at least one direction via at least one message received from the at least one portable wireless node.

30. The apparatus of claim 23, wherein the circuitry configured for obtaining at least one direction for establishing at least one beam toward the at least one portable wireless node comprises:
  circuitry configured for obtaining the at least one direction via experimentation with the at least one portable wireless node.

31. The apparatus of claim 23, wherein the circuitry configured for obtaining at least one direction for establishing at least one beam toward the at least one portable wireless node comprises:
  circuitry configured for obtaining at least one direction that is associated with at least one orientation position.

32. The apparatus of claim 31, wherein the circuitry configured for obtaining at least one direction that is associated with at least one orientation position comprises:
  circuitry configured for obtaining at least one direction that is associated with at least one orientation position of an auxiliary relay item.

33. The apparatus of claim 23, wherein the circuitry configured for obtaining at least one direction for establishing at least one beam toward the at least one portable wireless node comprises:
  circuitry configured for obtaining at least one direction that is associated with at least one spatial location.

34. The apparatus of claim 23, wherein the circuitry configured for obtaining at least one direction for establishing at least one beam toward the at least one portable wireless node comprises:

circuitry configured for determining the at least one direction to aim the at least one beam toward the at least one portable wireless node based at least partly on transmissions of multiple beams having multiple respective indicators.

35. The apparatus of claim 23, wherein the circuitry configured for obtaining at least one direction for establishing at least one beam toward the at least one portable wireless node comprises:

circuitry configured for determining the at least one direction to aim the at least one beam toward the at least one portable wireless node based at least partly on sweeping beam transmissions along a first path and slicing beam transmissions along a second path.

36. The apparatus of claim 1, wherein the circuitry configured for communicating with at least one of the portable wireless node or the fixed wireless node including circuitry configured for selecting one or more antenna assembly configuration parameters that are associated with at least one orientation position comprises:

circuitry configured for communicating with the at least one portable wireless node including circuitry configured for selecting the at least one beam in accordance with the at least one direction.

37. The apparatus of claim 36, wherein the circuitry configured for communicating with the at least one portable wireless node including circuitry configured for selecting the at least one beam in accordance with the at least one direction comprises:

circuitry configured for selecting one or more indications of multiple respective values to control multiple respective amplitudes of electromagnetic radiation emanating from multiple respective locations of at least one antenna assembly with the one or more indications corresponding to the at least one direction.

38. The apparatus of claim 36, wherein the circuitry configured for communicating with the at least one portable wireless node including circuitry configured for selecting the at least one beam in accordance with the at least one direction comprises:

circuitry configured for selecting one or more indications of how to configure at least one antenna assembly so as to produce the at least one beam in the at least one direction.

39. A method for portable wireless node auxiliary relay, the method being at least partially implemented by at least one device, the method comprising:

associating a portable wireless node auxiliary relay as an auxiliary of a portable wireless node;

serving as a relay between the portable wireless node and a fixed wireless node; and communicating with at least one of the portable wireless node or the fixed wireless node including selecting one or more antenna assembly configuration parameters that are associated with at least one orientation position based at least in part on association of the portable wireless node auxiliary relay as an auxiliary of the portable wireless node including at least:

selecting at least one beam that is directed at least partially away from a detected at least one location of human tissue.

40. A system for portable wireless node auxiliary relay, the system comprising:

means for associating a portable wireless node auxiliary relay as an auxiliary of a portable wireless node;

means for serving as a relay between the portable wireless node and a fixed wireless node; and means for communicating with at least one of the portable wireless node or the fixed wireless node including means for selecting one or more antenna assembly configuration parameters that are associated with at least one orientation position based at least in part on association of the portable wireless node auxiliary relay as an auxiliary of the portable wireless node including means for selecting at least one beam that is directed at least partially away from a detected at least one location of human tissue.

41. The apparatus of claim 1, wherein the circuitry configured for associating a portable wireless node auxiliary relay as an auxiliary of a portable wireless node comprises:

circuitry configured for identifying a portable wireless node auxiliary relay as an auxiliary of the portable wireless node in a data structure associated with the portable wireless node, the data structure including a conditions field identifying and specifying functionality of the portable wireless node auxiliary relay.

42. The apparatus of claim 1, wherein the circuitry configured for associating a portable wireless node auxiliary relay as an auxiliary of a portable wireless node comprises:

circuitry configured for associating a portable wireless node auxiliary relay as an article of clothing worn by a user of the portable wireless node.

43. The apparatus of claim 42, wherein the article of clothing worn by a user of the portable wireless node includes:

at least one of:

a hat, glasses, pants, shirt, jacket, belt, dress, a bracelet, an anklet, a watch, a smart phone holster, a smart case for a tablet computer, a shoe, an electronic bag, a satchel, a belt, a fanny pack, an electronic clothing insert, a jacket insert.

44. The apparatus of claim 1, wherein the circuitry configured for associating a portable wireless node auxiliary relay as an auxiliary of a portable wireless node comprises:

circuitry configured for associating the portable wireless node auxiliary relay as an article of furniture for use by a user of the portable wireless node.

45. The apparatus of claim 1, wherein the circuitry configured for associating a portable wireless node auxiliary relay as an auxiliary of a portable wireless node comprises:

circuitry configured for associating the portable wireless node auxiliary relay as an article of clothing worn by a user of the portable wireless node and positioned to avoid transmission through at least one portion of human tissue.

46. The apparatus of claim 1, wherein the circuitry configured for communicating with at least one of the portable wireless node or the fixed wireless node including circuitry configured for selecting one or more antenna assembly configuration parameters that are associated with at least one orientation position comprises:

circuitry configured for selecting one or more antenna assembly configuration parameters including one or more meta-material antenna control signal values.

\* \* \* \* \*

UNITED STATES PATENT AND TRADEMARK OFFICE
CERTIFICATE OF CORRECTION

PATENT NO.        : 9,491,637 B2
APPLICATION NO.   : 13/956107
DATED             : November 8, 2016
INVENTOR(S)       : Roderick A. Hyde et al.

Page 1 of 1

It is certified that error appears in the above-identified patent and that said Letters Patent is hereby corrected as shown below:

In the Claims

Column 34, Line 55, Claim 6: "figured for serving as a relay between a"
should be -- figured for serving as a relay between the --

Column 36, Line 3, Claim 12: "including circuityr"
should be -- including circuitry --

Signed and Sealed this
Thirty-first Day of January, 2017

Michelle K. Lee
*Director of the United States Patent and Trademark Office*